US008327308B2

(12) United States Patent
Nakagawa

(10) Patent No.: US 8,327,308 B2
(45) Date of Patent: Dec. 4, 2012

(54) METHOD AND APPARATUS FOR DESIGNING INTEGRATED CIRCUIT

(75) Inventor: Koichi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/177,111

(22) Filed: Jul. 6, 2011

(65) Prior Publication Data
US 2012/0023470 A1 Jan. 26, 2012

(30) Foreign Application Priority Data

Jul. 22, 2010 (JP) ................................. 2010-164499

(51) Int. Cl.
G06F 9/455 (2006.01)
G06F 17/50 (2006.01)
(52) U.S. Cl. ........ 716/134; 716/136; 716/106; 716/108; 716/111; 716/119
(58) Field of Classification Search .................... 716/51, 716/106, 108, 111, 119, 136
See application file for complete search history.

(56) References Cited

U.S. PATENT DOCUMENTS 6,618,834 B2  9/2003 Takeyama et al.
6,944,840 B2  9/2005 Sasaki et al.
2003/0101399 A1*  5/2003 Yoshikawa .................... 714/744

FOREIGN PATENT DOCUMENTS

JP  2002-149730 A  5/2002
JP  2002-245109 A  8/2002

* cited by examiner

Primary Examiner — Jack Chiang
Assistant Examiner — Brian Ngo
(74) Attorney, Agent, or Firm — Fujitsu Patent Center

(57) ABSTRACT

An integrated circuit designing apparatus for designing a semiconductor integrated circuit. The designing includes verifying the timing based on delay information included in the design data, the delay information is extracted from results of placing and wiring of the semiconductor integrated circuit; determining whether each value of hold-time errors generated as a result of the timing verification is smaller than a criteria value; extracting, when the value of a hold-time error is smaller than the criteria value, a wiring line in which the hold-time error is improved by performing a wiring line extension process, the wiring line is included in a path having the hold-time error; calculating, for the extracted wiring line, a wiring line extension distance corresponding to an insertion delay value that improves the hold-time error; and performing the wiring line extension process to extend the extracted wiring line by the calculated wiring line extension distance.

18 Claims, 17 Drawing Sheets

FIG. 6

| CELL NAME | CELL DELAY (ps) | OTHER PARAMETERS |
|---|---|---|
| BUF1 | 20 | (DELETED) |
| BUF2 | 40 | (DELETED) |
| BUF3 | 60 | (DELETED) |
| BUF4 | 120 | (DELETED) |
| BUF5 | 180 | (DELETED) |
| ... | ... | ... |

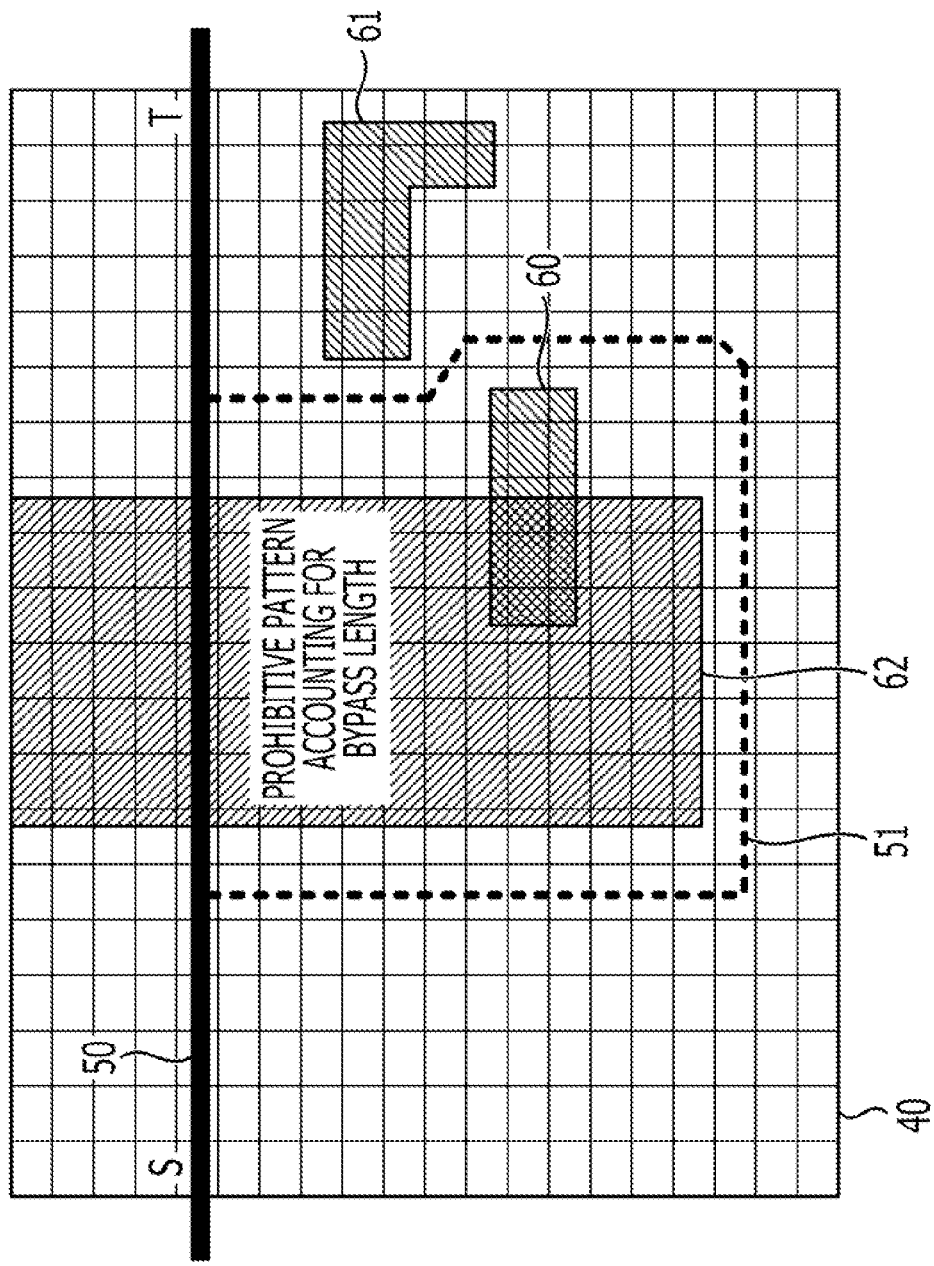

METHOD AND APPARATUS FOR DESIGNING INTEGRATED CIRCUIT

CROSS-REFERENCE TO RELATED APPLICATION

This application is based upon and claims the benefit of priority of the prior Japanese Patent Application No. 2010-164499, filed on Jul. 22, 2010, the entire contents of which are incorporated herein by reference.

FIELD

The embodiments discussed herein are related to a layout design of a semiconductor integrated circuit.

BACKGROUND

Shortening a design time period of a semiconductor integrated circuit currently becomes difficult as a circuit scale increases, process technologies are miniaturized, and an operating frequency of circuit becomes high. A layout design of the semiconductor integrated circuit is to be performed efficiently under these circumstances. To this end, the layout design is performed with the integrated circuit split, and timing modifications subsequent to the placing cells in the semiconductor integrated circuit and wiring wire lines connecting terminals of the placed cells are made through an engineering change order (ECO) process. Through the ECO process, the timing modification is performed by modifying logic of the circuit to reduce path delay, or modifying the layout of a circuit element. A technique of adjusting a clock delay is also used.

Related art is described in Japanese Laid-Open Patent Publication No. 2002-149730, and Japanese Laid-Open Patent Publication No. 2002-245109.

The ECO process described with reference to related art provides a remedial method to correct a timing error. For example, the ECO process makes a change to a circuit element (cell) having a different delay value and a different load driving power but having the same logic. Also through the ECO process, a repeater cell or a delay buffer is inserted, and a skew adjustment of a clock path is performed. The timing adjustment may be performed by changing a mounting position of a cell. These timing modification methods are performed by adjusting a delay through cell changing. The timing modification methods modify a large delay value and are thus considered effective in a timing verification typically performed during a middle design phase, in which a relatively large error still remains.

The modification through cell changing greatly changes the delay value at a modification location, possibly causing a new timing error. Even if a location degrading timing slightly is present in the timing correction during the middle design phase, such a location typically goes unnoticed because of the presence of another large error. As the final design phase draws, a new error may be caused during the timing correction, and affect the design process.

If a hold-time error is caused, a delay buffer may be inserted into a data path to delay a signal propagating through the data path. Depending on the delay value and the insertion location of the delay buffer, a setup error may be caused in another path routing through the inserted delay buffer. If a new timing error is caused in the timing correction close to the deadline of the design process, the design schedule may be delayed.

A hold-time error of a small value may still remain during the final design phase. The correction of the hold-time error only is desirable, and no adverse effect is desirable from the correction of the timing of the hold-time error.

SUMMARY

An integrated circuit designing apparatus for designing a semiconductor integrated circuit. The designing apparatus includes a memory configured to store design data and a processor configured to execute a procedure. The procedure includes verifying the timing based on delay information included in the design data stored in the memory, the delay information is extracted from results of placing and wiring of the semiconductor integrated circuit; determining whether each value of hold-time errors generated as a result of the timing verification is smaller than a criteria value; extracting, if the value of the hold-time error is smaller than the criteria value, a wiring line in which the hold-time error is improved by performing a wiring line extension process, the wiring line is included in a path having the hold-time error; calculating, for the extracted wiring line, a wiring line extension distance corresponding to an insertion delay value that improves the hold-time error of the path including the extracted wiring line; and performing the wiring line extension process to extend the extracted wiring line by the calculated wiring line extension distance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 illustrates a cell delay value in a delay buffer specified a cell library;

FIG. 15 illustrates a method of making a bypass wiring line with a virtual wiring line prohibitive area produced;

DESCRIPTION OF EMBODIMENTS

The embodiments of the invention are described in detail below. A layout design flow of a layout design technique of a semiconductor integrated circuit is described before the detailed description of the embodiments. One embodiment is mainly directed to a layout design of a large-scale and high-speed semiconductor integrated circuit.

Figure 1:
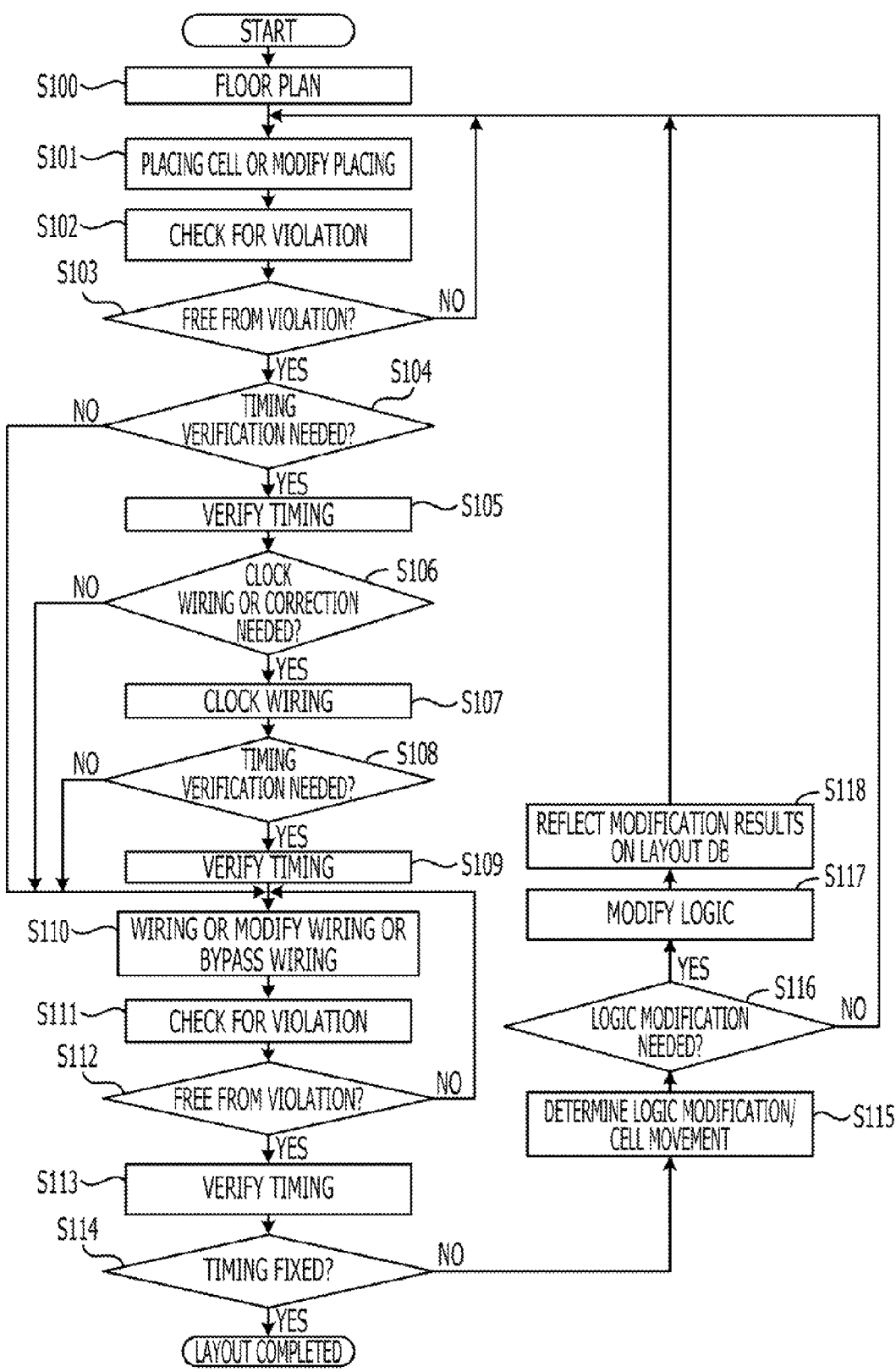
FIG. 1 illustrates a layout design flow underlying a layout design technique of a semiconductor integrated circuit of an embodiment.

FIG. 1 illustrates the layout design flow of the layout design technique of the semiconductor integrated circuit of the embodiment. Not only an automated placing and wiring process through a computer aided design (CAD) tool but also a manual layout design may be performed in a relatively large-scale and high-speed semiconductor integrated circuit. In the process flow of FIG. 1, an automated placing and wiring process through the CAD tool is performed in the relatively large-scale and high-speed semiconductor integrated circuit. In addition to the automatic placing and wiring process, a manual process for modifying, verifying, and checking the layout is performed as appropriate. The layout design flow of FIG. 1 may be used to lay out an entire semiconductor integrated circuit, or to lay out a particular circuit block forming the semiconductor integrated circuit. (Same as in layout design flows of FIGS. 2 and 3).

In the layout design flow of FIG. 1, a floor plan is first produced (S100). In the floor plan production operation, a placing position of each circuit block is determined taking into consideration a circuit scale, the number of terminals, wiring line destinations, and the like of the circuit block forming the semiconductor integrated circuit.

If the floor plan is determined, a cell forming the circuit is placed and then the placement of the cell is modified if needed (S101). The cell refers to a circuit element that serves as a specific function block including a transistor. After the cell placement operation is performed, a violation check is performed to check that placed area of the cells do not overlap each other (S102).

If any problem is found in the violation check in S102 (no from S103), processing returns to S101. If no problem is found in the violation check in S102 for modifying the placement of any problematic cell (yes from S103), processing proceeds to step S104.

A wiring operation remains to be performed when the cell placement (S101) and the violation check (S102) are completed. If the cell placement is not appropriate, timing errors including a setup time error may occur in a timing verification subsequent to the wiring process. In order to ensure the validity of the cell placing process in advance subsequent to the violation check in S102, the timing verification may be tentatively performed with a virtual wiring line capacitance assumed. If the tentative timing verification is to be performed (yes from S104), processing proceeds to S105 for a timing verification operation. If it is determined that a tentative timing verification (S105) is not to be performed subsequent to the cell wiring operation (no from S104), processing proceeds to S110 for a wiring operation.

In the timing verification in S105, a circuit delay calculation is performed on the assumption that a virtual wiring line capacitance exists in a wiring line that connects arranged cells. It is thus determined whether a timing condition such as a setup time is satisfied. If any problem is found in the timing verification in S105, processing returns to S101 as necessary to modify the cell placement although this branch from S105 is not illustrated. The timing verification techniques include static timing analysis (STA), and dynamic simulation. The dynamic simulation is based on actual delay information obtained subsequent to an actual wiring operation. The timing verification technique used herein is mainly the STA (throughout the embodiments).

If no problem is found in the virtual timing verification (S105), it is then determined whether a clock wiring line operation is to be performed (S106). A wiring operation for a clock signal has a higher priority and is thus performed before a wiring operation for a data signal such that clock skews are easily aligned at a terminal flip-flop (FF) of each clock tree supplied with a clock. If the clock wiring is performed with a higher priority (yes from S106), processing proceeds to S107 for the clock wiring operation. If the clock wiring is not performed with a higher priority (no from S106), a wiring operation in S110 described below may include the clock wiring. Even if the clock wiring operation is already completed in the timing verification to be discussed below, and no modification is needed in the clock wiring (no from S106), processing proceeds to S110.

The clock wiring is performed in S107 such that an appropriate clock delay is inserted in view of the clock skew. To adjust the clock insertion delay, an appropriate number of clock buffers are inserted or deleted.

A tentative timing verification is to be performed again in S109 in order to verify that the results of the clock wiring are free from any problem subsequent to the clock wiring operation in S107 (yes from S108). In the timing verification in S109, a circuit delay calculation for the clock wiring is performed on a wiring line capacitance resulting from an actual wiring and the circuit delay calculation for the other wiring is performed on a virtual wiring line capacitance assumed. It is thus determined whether the calculation results satisfy a specific timing condition. If a problem is found in the timing verification in S109, processing returns to S101 as necessary to modify the cell placement although such a branch is not illustrated. If no timing verification is needed in S109 (no from S108), processing proceeds to S110.

A designer may preset the determinations in S104, S106, and S108 on a setting screen of a CAD tool or a setting file to be input to the CAD tool when the designer performs the layout design using the CAD tool.

In S110, a wiring operation to produce a wiring connecting laid cells is performed subsequent to the cell placement operation (S101) or subsequent to the clock wiring operation (S107). The wiring operation (S110) is performed through a CAD-tool assisted, automated wiring process. A manual modification may be performed, i.e., the designer may select the modification method if the wiring of a circuit block operated in a particularly high clock frequency, or if a wiring modification is to be performed in response to the occurrence of a violation error to be discussed later. The designer places an instruction related to CAD modification content, and then modifies the wiring.

The wiring operation in S110 includes, in addition to the production of a new wiring connecting cells, a wiring modification operation performed if a problem is found in a violation check (S111) and a timing verification (S113) to be discussed later. If a violation such as a wiring shortcircuit is found, the wiring is re-drawn or routed through a bypass path to prevent the shortcircuit. The violation is thus avoided. When the clock wiring line operation in S107 is bypassed (no from S106), and a clock wiring line remains unfinished, the clock wiring is performed together including that clock wiring line in the wiring operation in S110.

If the wiring operation (S110) is complete, a violation check is performed to determine whether the wiring results satisfy a specific layout design rule (S111). More specifically, the violation check in S111 includes determining whether the design rule is satisfied, for example, the wiring lines are spaced by a specific wiring line spacing, determining whether no shortcircuit takes place, or determining whether no crosstalk noise problem takes place.

If any problem is found in the violation check in S111 (no from S112), processing returns to S110 to modify the wiring line suffering from the problem. The wiring modification operation (S110) and the violation check (S111) may be repeated by any times. If the violation of the rule is removed (yes from S112), a next timing verification operation (S113) is performed.

If the wiring results become free from the violation (yes from S112), the timing verification is performed to determine whether layout results subsequent to an actual wiring operation satisfy a specific timing condition (S113). In the timing verification in S113, a wiring line capacitance is detected from the actual wiring results, and a delay calculation is performed on all paths included in the circuit in accordance with the detected wiring line capacitance. It is thus determined whether each path included in the circuit satisfies the specific timing condition, for example, whether the path is free from a setup time error and a hold-time error (S113).

A number of timing errors are typically present subsequent to the first placing and wiring, and the value of the timing error is typically large. A timing correction operation to be discussed below and timing verification are thus repeated by a number of times to cause the timing error to converge.

If an error remains in the timing verification in S113 (no from S114), a timing error correction method is determined to correct a caused timing error in response to the content of the caused error (S115). The timing error correction method may include a logic modification responsive to the content of a caused error content, and a cell movement. More specifically, the timing error correction method includes reducing the timing error such that the clock skew becomes smaller, changing to a cell over a data bus having a different delay value and a different load drive power but having the same logic, and inserting a repeater cell or a delay buffer.

If the correction method determination in S115 concludes that a logic modification is to be performed (yes from S116), a logic modification is performed to correct the timing error (S117). The modification results are reflected on a layout database (S118). Returning to step S101, placing of the cell having undergone the logic modification is modified based on the updated database that is reflected with the logic modification results. If the correction method determination in S115 concludes that a logic modification is not needed (no from S116), processing directly returns to S101. A placement modification is performed to move the cell related to the timing error. The placement correction for correcting the timing error (S101) includes changing and moving the cell related to the timing error.

The violation check is performed on the placement results (S102) after the placement correction (S101) including the logic modification and the cell movement for correcting the timing error. If an error is found in the violation check in S102 (no from S103), processing returns to S101 to perform the placement modification. If no error is detected in the violation check in S102 (yes from S103), processing proceeds to the next operation. A series of operations to correct the timing error is performed to modify and move only the cell related to the timing error. Processing proceeds to the wiring correction operation in S110 without performing the tentative timing verification (S105) and the clock wiring (S107) if not particularly required.

In the wiring modification operation in S110, the wiring of the cell having undergone the logic modification and the cell movement to correct the timing error is redrawn. The violation check is performed again on the wiring operation results (S111). If the wiring becomes free from any problem (yes from S112), a series of correction operations for placing and wiring to correct the timing are complete.

If the series of timing correction operations for timing correction are complete, the timing verification is performed on the actual wiring results in accordance with the modified layout result (S113). If a timing error still remains in the timing verification (S113), the operations in S115-S118 and the modification operation of placing and wiring (S101-S112) are performed again. If the timing verification in S113 indicates no error (yes from S114), the layout design is complete.

If a timing error occurs in the final timing verification (S113) in the layout design flow of FIG. 1, the timing correction is performed. The timing correction includes the logic modification including a change to the cell having a different load drive power and the insertion of the delay buffer, or the modification in the cell placement position. The timing correction is effective in the middle phase of design in which a relatively large timing error still remains. The timing correction greatly modifies the delay value of a cell in a path having the timing error.

As the final phase of design draws close to the end thereof, only a hold-time error having a small timing error value may remain. An excessive amount of delay may be inserted through the above-described correction method, leading to an unintended setup error. In the semiconductor integrated circuit operating at a high speed, a cycle time of the clock is very short. The insertion of a single delay buffer could greatly affect the setup time, from path to path.

If a timing error is caused by a timing correction near the deadline of the final phase of design, the entire design schedule may be delayed. The timing correction, particularly, the correction of the hold-time error, at the final phase of design is preferably performed in a manner such that the rest of the circuit other than a portion suffering from the timing error is not affected. In the final phase of design, the hold-time error having a small value is desired to be corrected efficiently in a manner such that the rest of the circuit is not affected. An embodiment of a layout design intended for this purpose is described with reference to FIG. 2 and subsequent drawings.

Figure 2:
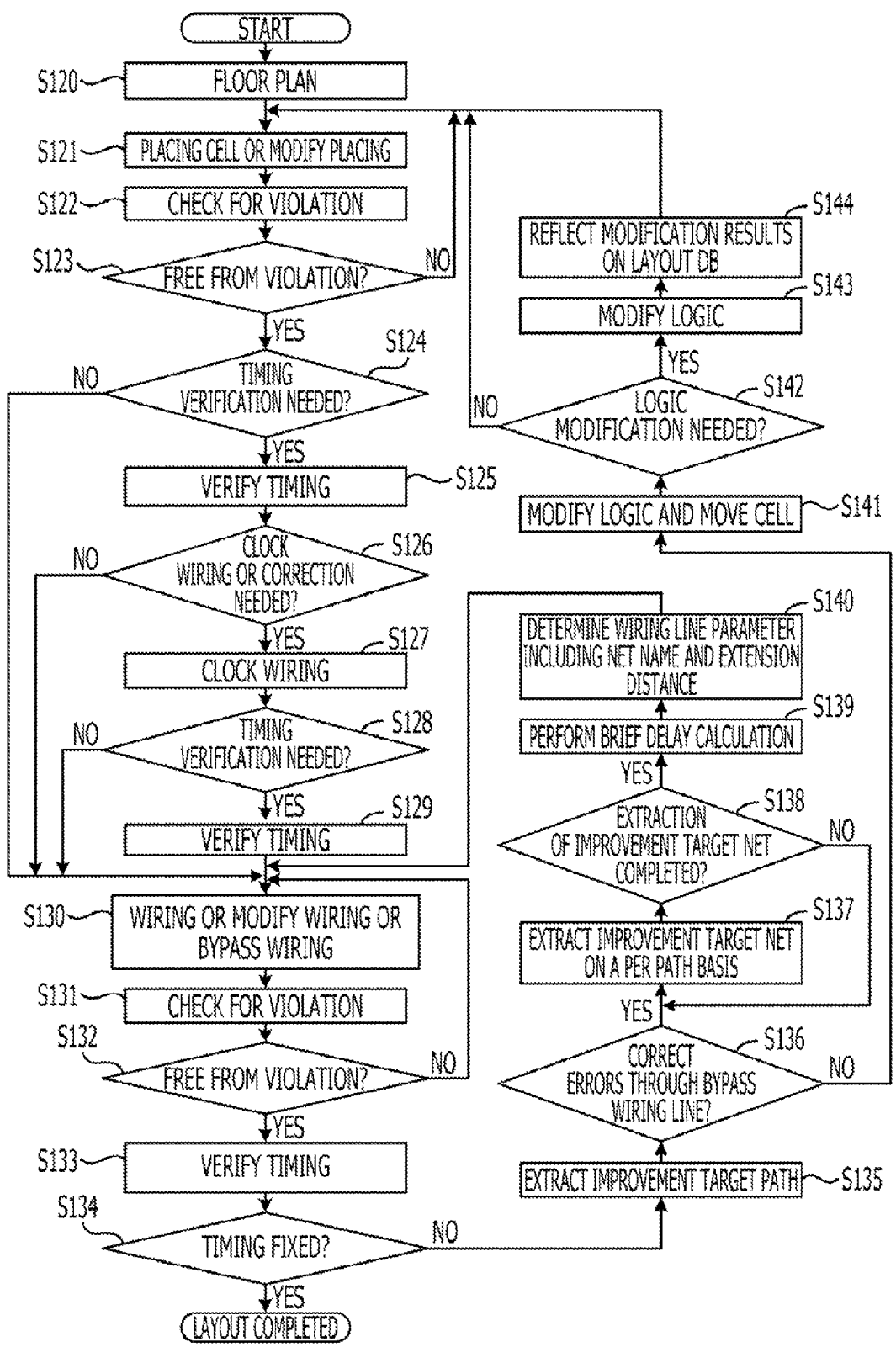
FIG. 2 illustrates a layout design flow of the embodiment.

FIG. 2 illustrates a layout design flow of the embodiment. Operations S120 to S134 and S141 to S144 of FIG. 2 remain basically unchanged from operations in S100 to S118 in the flowchart of FIG. 1, respectively. The discussion that follows focuses on a difference between the two flowcharts. More specifically, S135 to S140 added in the flowchart of FIG. 2 are mainly discussed.

In the flowchart of FIG. 2, a timing error may remain in the timing verification (S133) subsequent to the placement and wiring operation (no from S134). A path that may be improved by simply performing a bypass wiring operation is extracted from paths suffering from timing errors (S135). It is then determined whether the remaining timing errors are to be corrected through the bypass wiring (S136).

If it is determined that the remaining timing errors are not to be corrected through the bypass wiring (no from S136), processing proceeds to S141. More specifically, if a timing error too large to be corrected through the bypass wiring is present, processing proceeds to S141. The timing correction through the logic modification including the cell change and the buffer insertion is then performed in the same manner as with each routine subsequent to S115 of FIG. 1.

If it is determined in S136 that the timing errors are to be corrected through the bypass wiring (yes from S136), processing proceeds to S137. For example, if the remained timing errors are small enough to be corrected by the bypass wiring, timing correction is preferably performed simply through the bypass wiring. In S137, an improvement target net serving as a point that may be improved through the bypass wiring operation is extracted on a per path basis of the paths suffering from the timing errors. In such a case, a bypass wiring point is extracted through an extraction method to be described below such that an area of influence by the timing correction is small.

The extraction of the net serving as the bypass wiring point corrected by the bypass wiring line is complete (yes from S138). A brief delay calculation is then performed to estimate what degree of bypass wiring is to be performed on the extracted net (S139). The brief delay calculation is described below.

If the extraction of the improvement target net is not complete in the extraction operation of the improvement target net (S137) via the bypass wiring (no from S138), i.e., if an optimum point for the bypass wiring operation is not found for the path extracted in S135, processing returns to S137. The next best bypass wiring point is then extracted. If the bypass wiring points for all the improvement target nets are extracted, the brief delay calculation in S139 is performed.

After the brief delay calculation for each net extracted in S135 (S139), a parameter for wiring a bypass line to each net is determined (S140). The parameters to be determined include a net name of each net serving as a target for the bypass wiring and an extension distance of a wiring line that needs a bypass wiring line to correct the timing error.

Once the wiring parameters are determined for the net as the bypass wiring target in S140, processing proceeds to S130 for a wiring modification operation. The wiring modification is performed on each net of the extracted bypass point. The bypass wiring operation is described in detail below.

The bypass wiring operation is completed in S130. The violation check (S131) and the timing verification (S133) are performed again. S135 and subsequent operations are repeated until no timing error is present. If the timing converges with all the timing errors removed in the timing verification in S133 (yes from S134), the layout design is complete.

Figure 3:
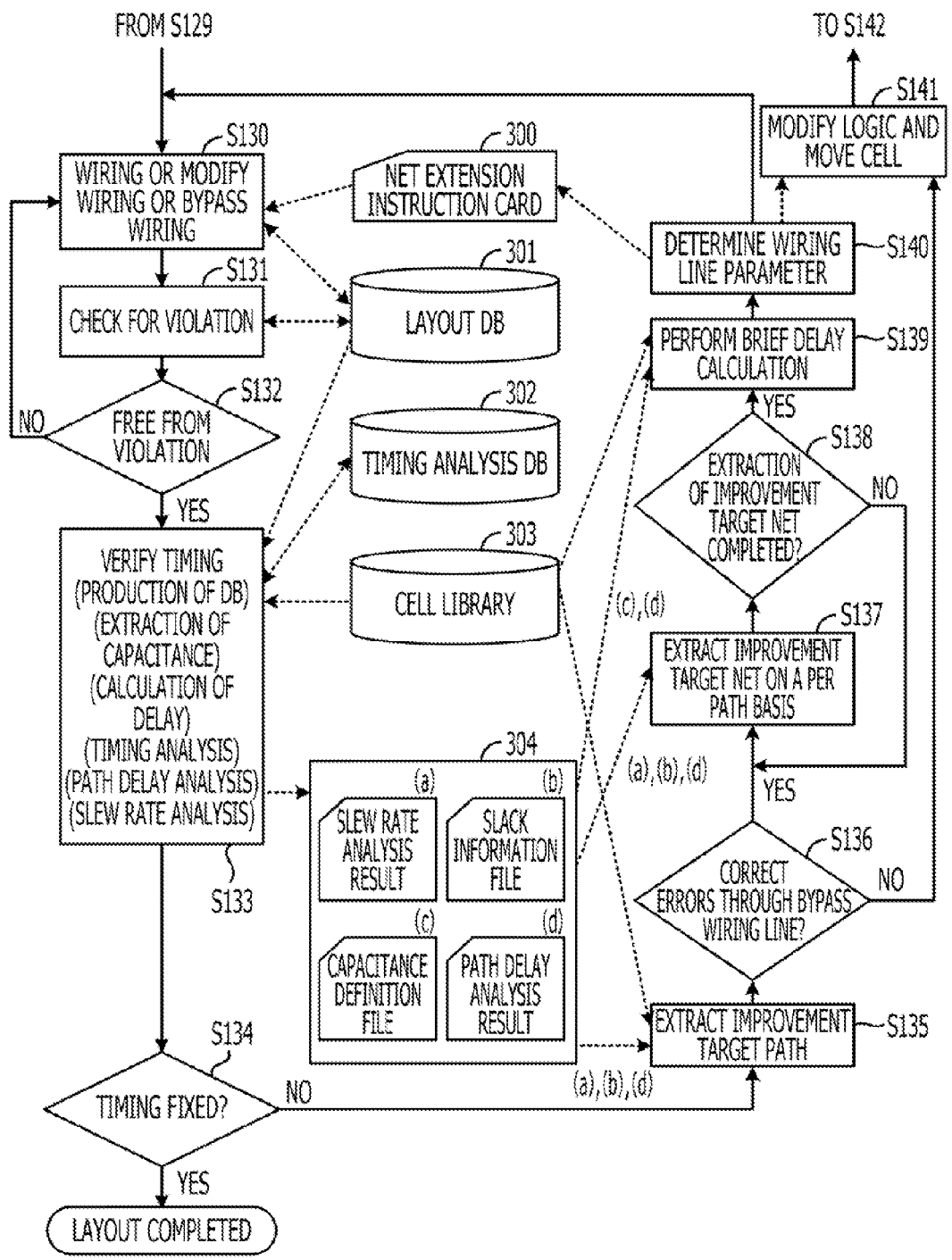
FIG. 3 illustrates a relationship between a layout design process and data in accordance with the embodiment.

FIG. 3 illustrates a relationship between a layout design process and data in accordance with the embodiment. As illustrated in FIG. 3, operations in S130 to S141 are identical to operations in S130 to S141 of FIG. 2, respectively. FIG. 3 illustrates, in the center of the flowchart, databases 301 to 303 storing data and control files used in S130 to S141, a control file 300, timing analysis results and capacitance definition files 304, and the like.

The net extension instruction card 300 of FIG. 3 is a control file storing the content of the wiring parameter determined in S140 with respect to each bypass wiring target net extracted in S138. The layout DB 301 stores circuit information used in the layout design and data of a variety of layouts generated in the layout design. The timing analysis DB 302 is a database for the timing verification, and is generated based on information of the layout DB 301 and the cell library 303 prior to the timing verification (S133). The cell library 303 stores physical information of each cell forming a circuit as a layout design target. The physical information includes logic information, and information related to a terminal, wiring, contact, load capacitance drive power, and delay.

The result and capacitance definition file 304 stores information resulting from the timing verification (S133). The result and capacitance definition file 304 thus stores slew rate analysis result (a), slack information file (b), capacitance definition file (c), and path delay analysis result (d). The word "slack" refers to a delay margin on timing requirements, such as the setup time and the hold time of each path. The path delay refers to the delay value of a data path and the delay value of a clock path, based on the delay value of each cell and each wiring line included in the path as the timing verification target.

The slew rate analysis result 304(a) includes information related to a signal waveform of a signal propagating through a wiring line and a cell specified by the layout data, i.e., a rising time and a falling time of the signal. The slack information file 304(b) includes information related to a delay margin of the setup time and the hold time of a FF serving as a timing analysis target. The capacitance definition file information 304(c) includes information related to a wiring capacitance of the wiring and the cell specified by the layout data, and an input terminal capacitance of the cell. The path delay analysis result 304(d) includes, in addition to a cumulative delay value of a data path and a clock path of paths serving as the timing verification target, a delay value of each cell and a wiring forming the path. The path delay analysis result 304(d) also includes information related to a net name, a cell name, the type of the cell, and the number of branches of the wiring with respect to the wiring and the cell forming the path serving as the timing verification target. Information included in these files (304) is used in the extraction operation of the wiring serving as a target of the bypass wiring operation to be discussed later (S137), the brief delay calculation operation (S139), and the operation for determining the variety of parameters for use in the bypass wiring operation (S140), and other operations.

Each of the slew rate analysis result (a), the slack information file (b), and the path delay analysis result (d) includes at least the information related to the path suffering from the timing error out of the information resulting from the timing verification (S133). The timing verification through the standard STA typically outputs the worst path having the smallest slack value (or the largest error value). The data of (a), (b), and (d) of the result and capacitance definition file 304 includes information related to the timing analysis results of all the paths sharing the cell and the net included in the worst path. More specifically, the result and capacitance definition file 304 stores the slack information of all the paths related to the net included in the path suffering from the timing error regardless of whether the timing error has occurred or not on the path. If the slack information of all the paths related to the net included in the path suffering from the timing error is not included in the result and capacitance definition file 304, it is difficult to estimate the influence caused on the other paths in response to the correction of a particular net.

The capacitance definition file (c) stores capacitance values of a wiring capacitance, a load capacitance, and an input terminal capacitance of a cell and a wiring line specified by the layout data, in accordance with the layout DB 301 and the cell library 303.

The bypass wiring operation in S130 is performed on a wiring serving as a target of the bypass wiring operation in response to an instruction of the net extension instruction card 300. The data of the layout DB 301 is referenced, and the layout data subsequent to the bypass wiring operation is stored onto the layout DB 301. If the bypass wiring operation (S130) is complete on all the bypass wiring operation targets, a violation check is performed as to whether the wiring results satisfies the specific layout rule (S131).

The layout data subsequent to the wiring operation stored on the layout DB 301 is referenced in the violation check in S131. The violation check is performed to determine whether the results of the wiring operation performed in S130 satisfy the specific layout design rule. If the results indicate a rule violation such as an inter-line shortcircuit or a line spacing error, the error information is accounted for on the layout DB 301. Returning to S130 (no from S132), the location causing the violation is corrected.

The layout DB 301 and the cell library 303 are referenced first in the timing verification in S133. The capacitances of the cell and the wiring are extracted from the layout data after the actual wiring operation. The delay calculation is performed to determine the cell delay and the wiring delay of the circuit in accordance with the capacitance information of the extracted capacitances. The timing analysis DB 302 is thus generated. The capacitance definition file 304(c) is also generated. In the operation in S133, the timing analysis is performed using the timing analysis DB 302. The timing analysis results are thus obtained including the slew rate analysis result 304(a), the slack information file 304(b), and the path delay analysis result 304(d).

If the timing verification (S133) indicates no timing error (yes from S134), the layout process is complete. If a timing error still remains (no from S134), processing proceeds to S135 and subsequent operations.

Extracted in the improvement target path extraction operation (S135) is a timing improvement target path in accordance with the cell library 303 and the result and capacitance definition file 304 resulting from the timing verification (S133). The extraction method of the timing improvement target path in S135 is described below. The result and capacitance definition file 304 to be used in the timing verification in S135 may include the slew rate analysis result (a), the slack information file (b), and the path delay analysis result (d).

If the timing errors output in the timing verification in S133 are correctable through the timing correction of the bypass wiring (yes from S136), a point to be bypass wired is extracted for each path extracted in S135 (S137).

A net as an improvement target in the bypass wiring operation is extracted on each of the paths suffering from the timing error in S137. In this case, the net as a bypass wiring operation target is extracted in accordance with the slew rate analysis result (a), the slack information file (b), and the path delay analysis result (d) included in the result and capacitance definition file 304 output in the timing verification (S133). A specific extraction method of the net as a bypass wiring operation target is described below.

A net is extracted as a bypass wiring operation target (yes from S138). A brief delay calculation is performed to estimate what degree of bypass wiring is needed. The brief delay calculation is performed using the cell library 303, and the capacitance definition file 304(c) and the path delay analysis result 304(d) (S139). Using the results of the brief delay calculation (S13), a variety of parameters are determined on each net extracted in S135 to perform the bypass wiring operation (S140). The net extension instruction card 300 is then generated in accordance with the determined parameters.

Figure 4:
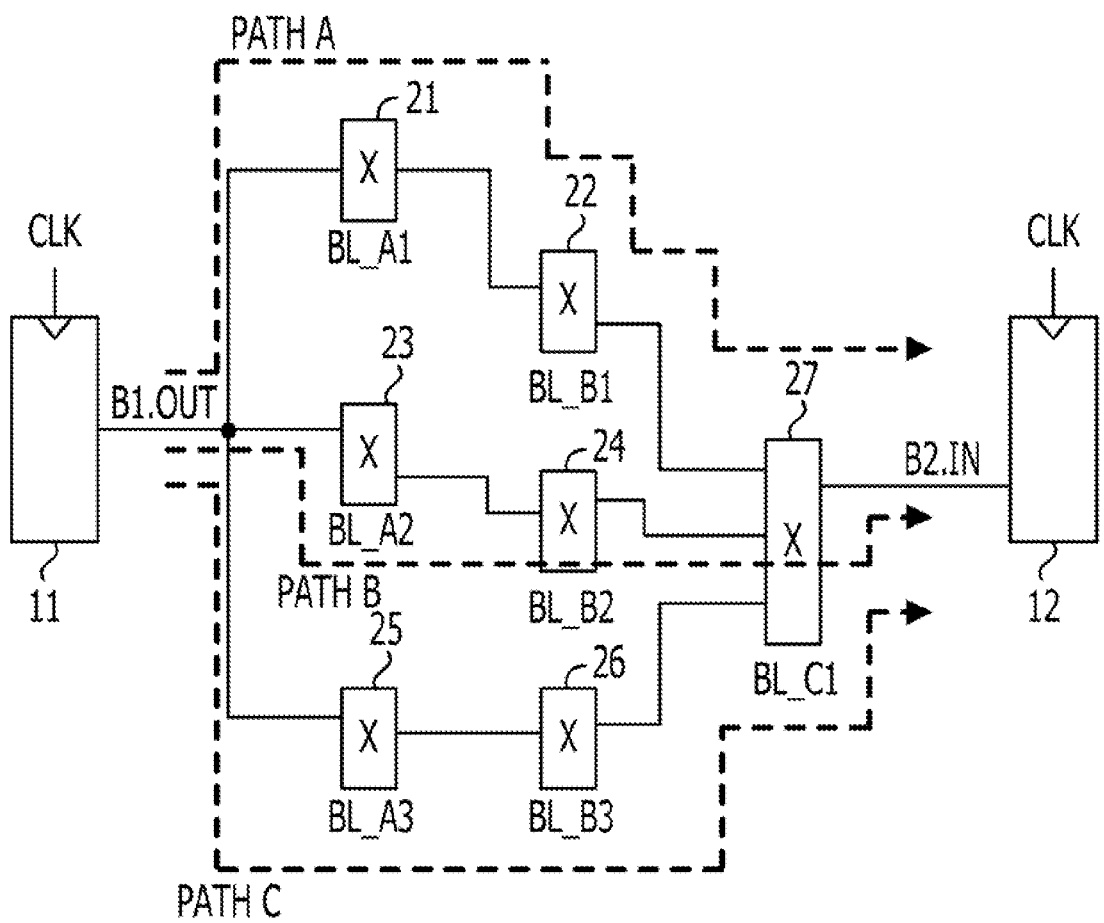
FIG. 4 illustrates a plurality of paths in a circuit example.

FIG. 4 illustrates an example of paths serving as a timing analysis target in the timing verification of paths between FFs in the circuit. As illustrated in FIG. 4, three paths (path A, path B, and path C), composed of a plurality of logic cells 21-27 (instances: BL_A1 through BL_A3, BL_B1 through BL_B3, and BL_C1), is present between two FF cells 11 and 12 (instances B1 and B2). The logic cells 21-27 are logic gates, each having a particular function such as an AND gate, an OR gate, or a selector. The logic cell is diagrammatically denoted by a rectangle in FIG. 4.

As illustrated in FIG. 4, path A causes a signal output from B1.OUT to travel through BL_A1.X (X refers to a terminal name, and the same is true in the remaining figures), BL_B1.X and BL_C1.X, and then to reach B2.IN. Path B causes the signal output from B1.OUT to travel through BL_A2.X, BL_B2.X, and BL_C1.X and then to reach B2.IN. Path C causes the signal output from B1.OUT to travel through BL_A3.X, BL_B3.X, and BL_C1.X and then to reach B2.IN.

Each of the FF11 and the FF12 illustrated in FIG. 4 is connected to a clock signal (CLK). The timing analysis is carried out with respect to the clock period of the clock signal. More specifically, the margin, i.e., slack of the setup time and the hold time of the FF12 is determined when the signal output from the FF11 (B1.OUT) has reached the input terminal of the FF12 (B2.IN) after travelling through the paths (path A through path C). If the slack value is negative, i.e., if signal arrival timings of the signals travelling through paths A-C fail to satisfy a specific timing condition, a timing error has occurred.

Figure 5:
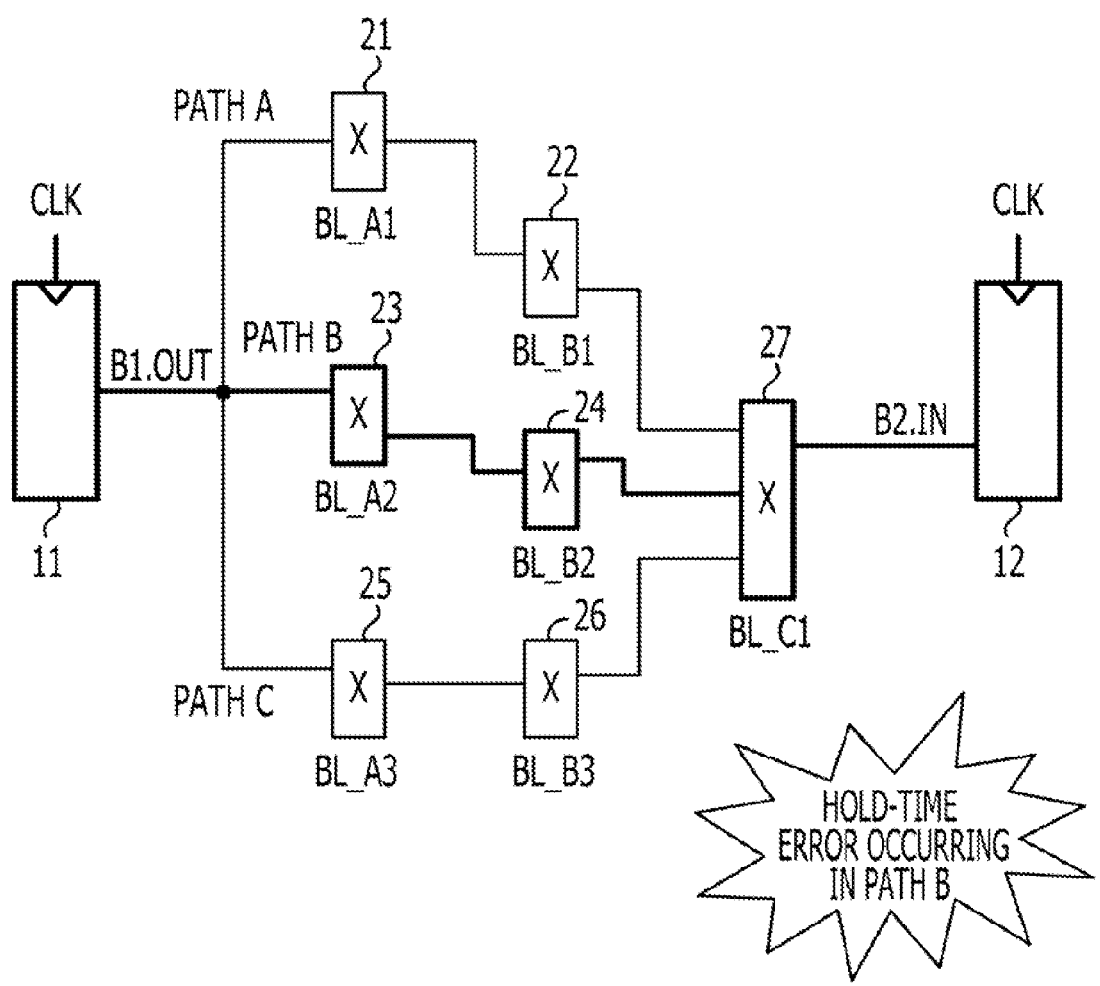
FIG. 5 illustrates a path in the circuit example with a hold-time error occurring.

FIG. 5 illustrates, with a solid line, path B along which a hold-time error takes place in the circuit of FIG. 4. It is assumed that no timing error takes place along path A and path C, and that a timing error takes place along path B only. Although no timing error takes place along path A and path C, almost no slack margin is present in the setup time of each of path A, path B, and path C. The value of the hold-time error occurring through path B is very small, and is slightly smaller than a slack value of the setup time of path B.

As illustrated in FIG. 5, the hold-time error having a very small value takes place along path B with almost no slack permitted in the setup time along each of path A through path C. If the hold-time error is corrected by inserting a delay buffer under this condition, there is a possibility that a setup time error is caused. More specifically, the insertion of the delay buffer introduces a delay larger in value than the slack value of the setup time, leading to a new setup time error. Under this condition, the correction involving cell modification through the insertion of the delay buffer is avoided. Wiring delay is desirably increased by performing a bypass wiring operation on part of the wiring along path B suffering from the hold-time error wherein the part of the wiring does not affect the other paths. The hold-time error is thus corrected.

According to the embodiment, a timing error having a very small value may be found in the timing analysis result in the timing convergence state, i.e., when the placement and wiring are almost finished. The timing is thus converged through a minimum timing correction through which no other timing error is caused in a secondary fashion. How operations in S130 to S140 of FIG. 3 are performed is described with reference to the circuit of FIG. 5.

If the results of the timing verification in S133 of FIG. 3 indicate that a hold timing error having a small value remains in path B of FIG. 5, timing remains to converge (no from S134 of FIG. 3). The extraction operation of the improvement target path is performed in S135 of FIG. 3. In this case, the extraction operation of the improvement target path performed in S135 of FIG. 3 is based on the premise that a hold-time error having a small error value occurs, and is intended to determine whether the path is to be timing-corrected through the bypass wiring operation only.

A determination criterion as to whether the timing correction is to be performed through the bypass wiring operation is that the results of the timing verification (S133) indicate that a remaining timing error is only a hold-time error having a small value. Another determination criterion is whether the correction of the hold-time error through the insertion of the delay buffer possibly affects another path, and delays the entire design process. More specifically, at the final phase of layout design, the timing correction through the bypass wiring operation is desirable.

Whether the timing correction through the bypass wiring operation is preferred or not depends on technology used in design, characteristics of library, and the CAD tool. From experience, the designer may determine whether to perform the timing correction through the bypass wiring operation. More objective criteria may be desirably used in order to perform the design process efficiently using an automated placing and wiring tool in a short period of time.

The improvement target path is extracted in S135 of FIG. 3. If any specific criterion derived from the user's experience is available on each technology used, that criterion may be used to determine whether the path is to be bypass wired. More specifically, depending on whether the value of a hold-time error remaining in the results of the timing verification (S133) is within a criteria value, the user determines whether the path is to be bypass wired or not.

If there is no criteria value as to whether the timing error is to be corrected through the bypass wiring operation, a more objective criterion is desired to be used. One of such objective criteria is that the smallest cell delay value is used out of cell delay values of delay buffers possibly used in the correction of the hold-time error included in the cell library in use.

Five cells (BUF1 to BUF5) of FIG. 6 serving as delay buffers for use in the correction of the hold-time error are included in the cells in the cell library 303. Whether to correct the timing error through the bypass wiring operation is determined depending on whether the value of the hold-time error is smaller than a cell delay time of 20 ps (picoseconds) of BUF1. The BUF1 has the shortest cell delay time from among the delay buffers listed in FIG. 6. More specifically, if the value of the hold-time error is larger than 20 ps, the timing correction is performed through the insertion of the delay buffer. If the value of the hold-time error is smaller than 20 ps, the timing correction is performed through the bypass wiring operation. The shortest cell delay time from among the cell delay times of the cells is used to determine whether the timing error is corrected through the bypass wiring operation. The hold-time error is thus corrected using an objective criterion.

It is thus determined in S135 of FIG. 3 whether the values of the hold-time errors output from the timing verification (S133) is smaller than the criteria value (the criteria value from the user's experience or the shortest cell delay time). In response to the determination result in S135, the path with the hold-time error having the value smaller than the criteria value is to be corrected in timing error through the bypass wiring operation.

It is thus determined in S135 whether all the paths having the hold-time errors have the values thereof smaller than the criteria value. It is then determined whether the hold-time errors remaining in the timing verification (S133) are to be corrected through the bypass wiring operation (S136).

Errors found in the timing verification (S133) may include, in addition to the hold-time error, a setup error, a clock pulse-width error, and other errors. Generally speaking, a timing error such as a setup error is corrected first to satisfy a circuit operating frequency as target specifications. In the final design phase where the embodiment is applicable, it is thus assumed that the timing correction other than the hold-time error has been solved.

If a hold-time error larger in value than the criteria value remains, the timing correction is performed on the remaining hold-time error through the insertion of a delay buffer preferably earlier than the correction of the other hold-time errors. More specifically, if the placement and wiring of a cell is corrected by inserting a delay buffer, such a correction is likely to affect the delay of another path related to the correction location, and a wiring surrounding the correction location. If such a correction is performed first, the timing is considered to converge earlier. If a hold-time error larger in value than the criteria value remains and thus the hold-time error is decided to be corrected through the bypass wiring operation (no from S136), processing proceeds to S141 and subsequent operations. A path causing a hold-time error larger in value is corrected through the delay buffer insertion. This process allows the layout design tool to perform an automatic timing correction easily and efficiently.

A hold-time error having a large value and a hold-time error having a small value correctable through the bypass wiring operation may coexist when the timing correction of the entire circuit almost converges. In such a case, the parallel correction of these timing errors may be more efficient. Hold-time errors, each larger in value than the criteria value, may remain and the number of such hold-time errors may be small in S136. The correction of the hold-time errors may not affect the other circuit. In such a case, the hold time correction through the delay buffer insertion and the hold time correction through the bypass wiring operation may be concurrently performed, though such operation is not illustrated in FIG. 3. The correction through the delay buffer insertion could cause a new timing error. It is preferably verified that the effect of the correction through the cell modification and the correction through the bypass wiring operation on the other paths is small.

It may be determined that both the correction through the cell modification and the correction through the bypass wiring operation are to be performed in parallel. In such a case, even if a hold-time error having a large value remains in S136, processing proceeds to S137 in accordance with another determination operation (not illustrated) or a manual operation by the user. Operations in S137 to S140 are performed on the path as a target of the bypass wiring operation to generate the net extension instruction card 300, and processing proceeds to S141 (as denoted by an arrow-headed broken line extending from S140 to S141). Through S141 and subsequent operations, the correction is performed on a hold-time error larger in value than the specific criteria value using the delay buffer. When processing proceeds to the wiring correction in S130 again, the wiring correction is further performed by reading the net extension instruction card 300 generated in S140. More specifically, in S130, the timing correction is performed through the bypass wiring operation on a hold-time error having a small error value together with the wiring correction through the delay buffer insertion. If the hold time correction through the delay buffer insertion and the hold time correction through the bypass wiring operation are performed in parallel in the particular state of the final design phase, the timing may converge early.

The extraction method of a correction location, i.e., bypass point to undergo the bypass wiring operation is described below. If it is determined in S136 that the path suffering from the hold-time error is to be corrected through the bypass wiring operation, processing proceeds to S137. A bypass point is extracted as the correction location that is to be actually bypass-wired. The extraction method of the correction location, i.e., the bypass point to undergo the bypass wiring operation is described below using the circuit of FIGS. 4 and 5.

Figure 7:
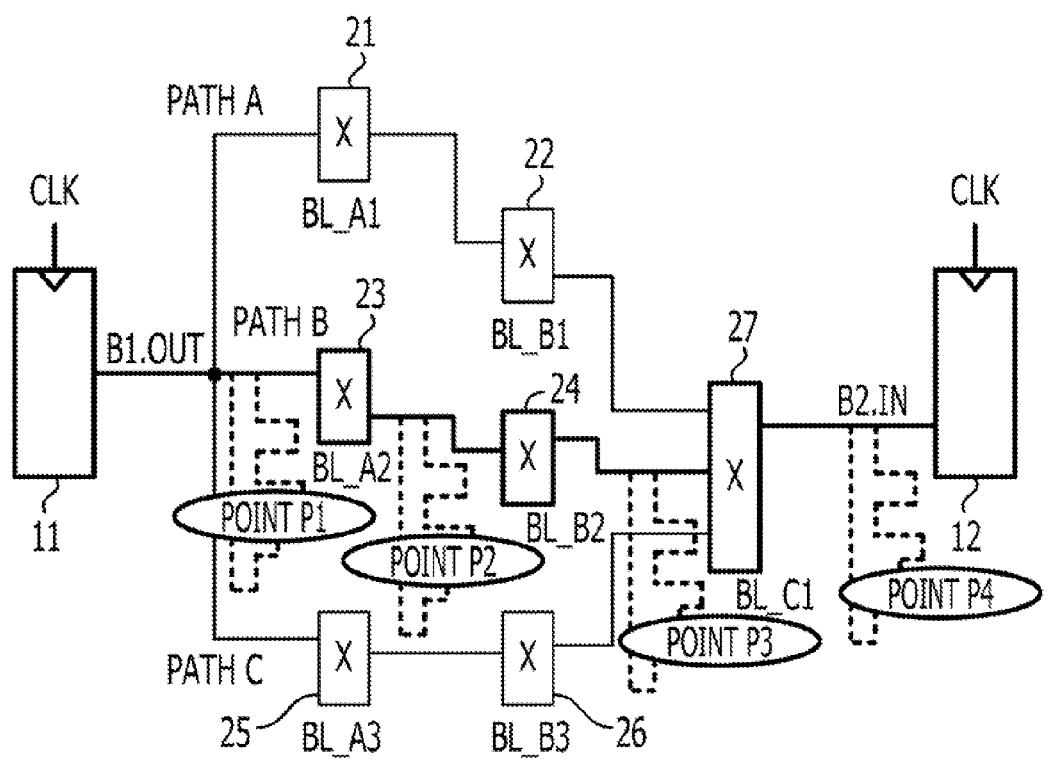
FIG. 7 illustrates a delay insertion point of a bypass wiring line in the circuit example of the embodiment.

FIG. 7 illustrates delay insertion points of a bypass wiring line added to the circuit in accordance with the embodiment. If a hold-time error having a small error value is present in path B as illustrated in FIG. 7, four points of point P1 through point P4 serve as points (wiring lines) that are target candidates of the bypass wiring operation. A point appropriate for the timing correction of the hold-time error through the bypass wiring operation is extracted from among the points.

Described below are conditions according to which a wiring line serving as a delay insertion point through the bypass wiring operation is extracted. Condition 1: a wiring line length is not too short; condition 2: the number of branches is small (the number of branches is preferably 1); condition 3: a signal waveform of a signal propagating through the wiring line does not have too large distortion; and condition 4: a modest level of margin of delay is permitted along a path that runs through the wiring line.

These conditions are preferably satisfied. The condition 1 is to be satisfied because if a wiring line serving as a target of the bypass wiring operation is too short, no space is available to route a bypass wiring line. The condition 2 on the number of branches is to be satisfied because the delay insertion through the bypass wiring line affects a path other than the timing correction target. The condition 3 is to be satisfied because if the bypass wiring operation is performed on a wiring line through which a distorted signal (for example, a signal having a waveform suffering from 50% or higher distortion of a limit) travels, the signal is even further degraded in distortion. The signal may violate a standard slew rate value related to the signal distortion. The condition 4 is to be satisfied for preventing a setup time error caused in response to the delay insertion through the bypass wiring.

It the timing correction is performed through the bypass wiring operation, a bypass wiring line is preferably formed in only one wiring line in a single path suffering from the hold-time error. If a plurality of wiring lines are extended from a single path, it is difficult to predict the degree of improvement, and an adverse effect may be created. If a bypass wiring line is extended from a net common to a plurality of paths, two bypass wiring lines may be extended from the one path. This is described in detail below with reference to FIG. 12.

A desired delay value may be inserted by extending a wiring at one location by a bypass wiring line in order to correct a hold-time error. Referring to FIG. 7, four points P1-P4 may serve as bypass wiring targets in path B in the circuit. Which one of the four pints P1 to P4 to select as a target of the bypass wiring line is determined taking into consideration an area of influence to another path if a delay is inserted into each point.

If a delay is inserted into a wiring as a particular point in the path suffering from the hold-time error, a slack of the setup time is reduced in each of the paths routing through that point by an amount equal to the inserted delay. If any path from among the paths including the delay insertion point has no margin available in the slack value of the setup time, the delay insertion in the hold-time error correction causes a setup time error. It is thus needed to find a point at which the delay insertion in the hold-time error correction causes a minimum effect on the setup time of other paths.

The areas of influence of the delay insertion at the four pints (P1 to P4) of FIG. 7 are described below with reference to FIGS. 8 to 11.

Figure 8:
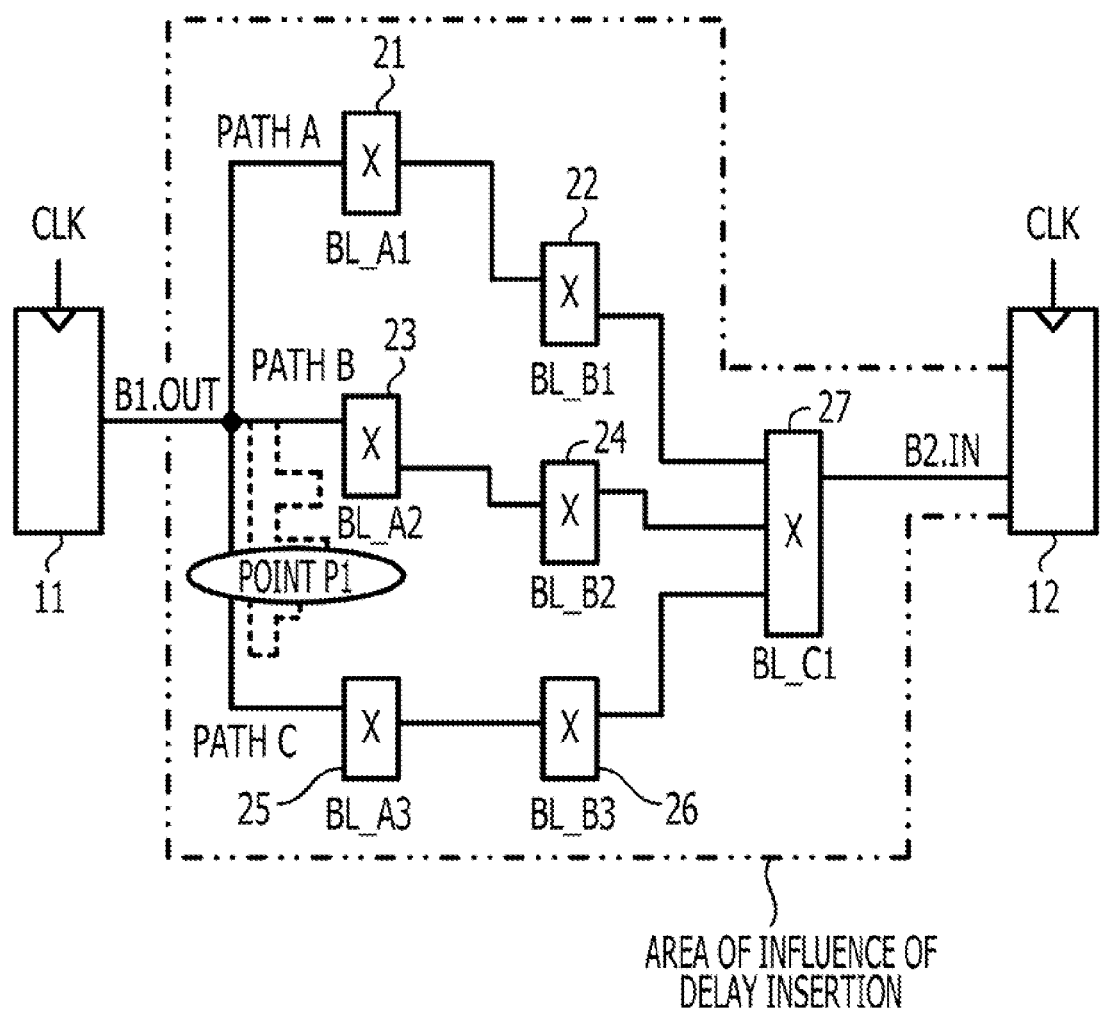
FIG. 8 illustrates an area of influence of a delay of a bypass wiring line inserted to a point P1 in the circuit example.

FIG. 8 illustrates the area of influence caused if a delay of a bypass wiring is inserted to the point P1 in FIG. 7. The wiring line related to the point P1 is connected to an output terminal (B1.OUT) of the FF11. The wiring line is shared not only by path B suffering from the hold-time error, but also by path A, and path C. If the delay is inserted to the point P1, the area of influence responsive to the delay insertion becomes an area enclosed by a two-dot-and-three-dash line. In other words, the delay insertion affects all the paths including path A, path B, and path C as illustrated in FIG. 8.

Figure 9:
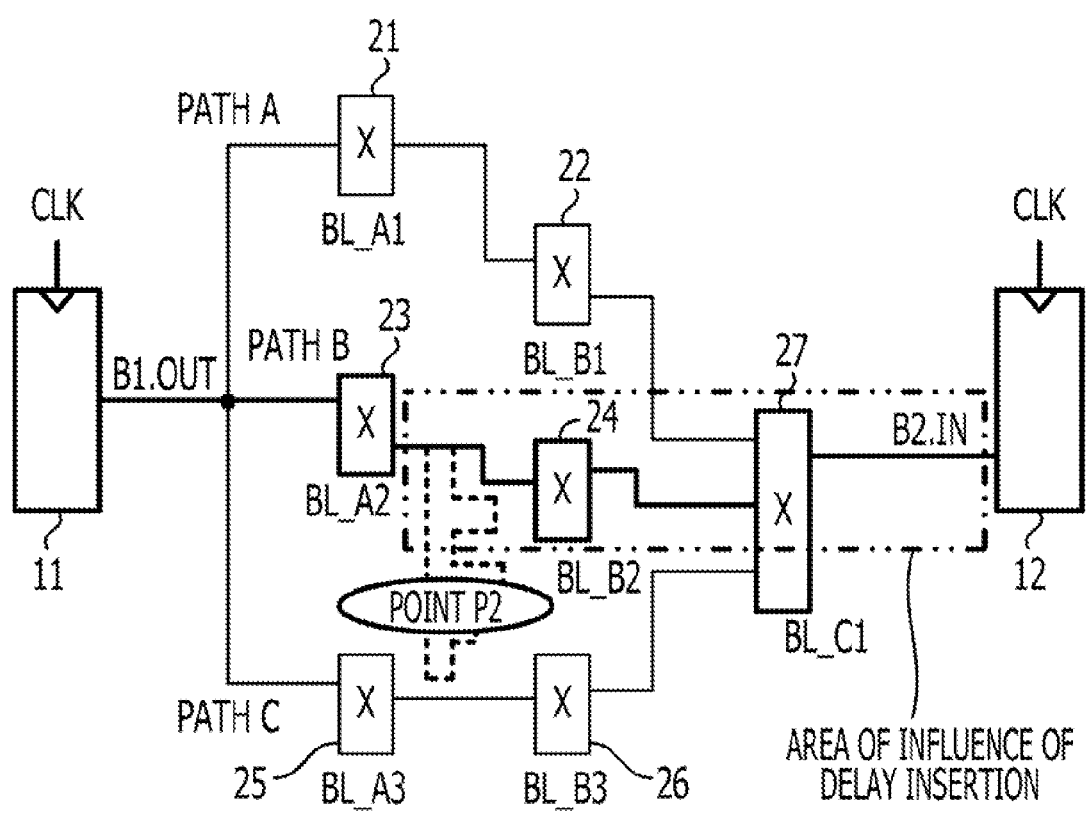
FIG. 9 illustrates an area of influence of a delay of a bypass wiring line inserted to a point P2 in the circuit example.

FIG. 9 illustrates the area of influence caused if a delay of a bypass wiring is inserted to the point P2 in FIG. 7. The wiring line related to the point P2 connects the logic gate 23 and the logic gate 24 forming path B, and thus has no branch to the other paths. The area of influence with the delay inserted to the point P2 becomes an area enclosed by a two-dot-and-three-dash line, and thus affects only path B as illustrated in FIG. 9.

Figure 10:
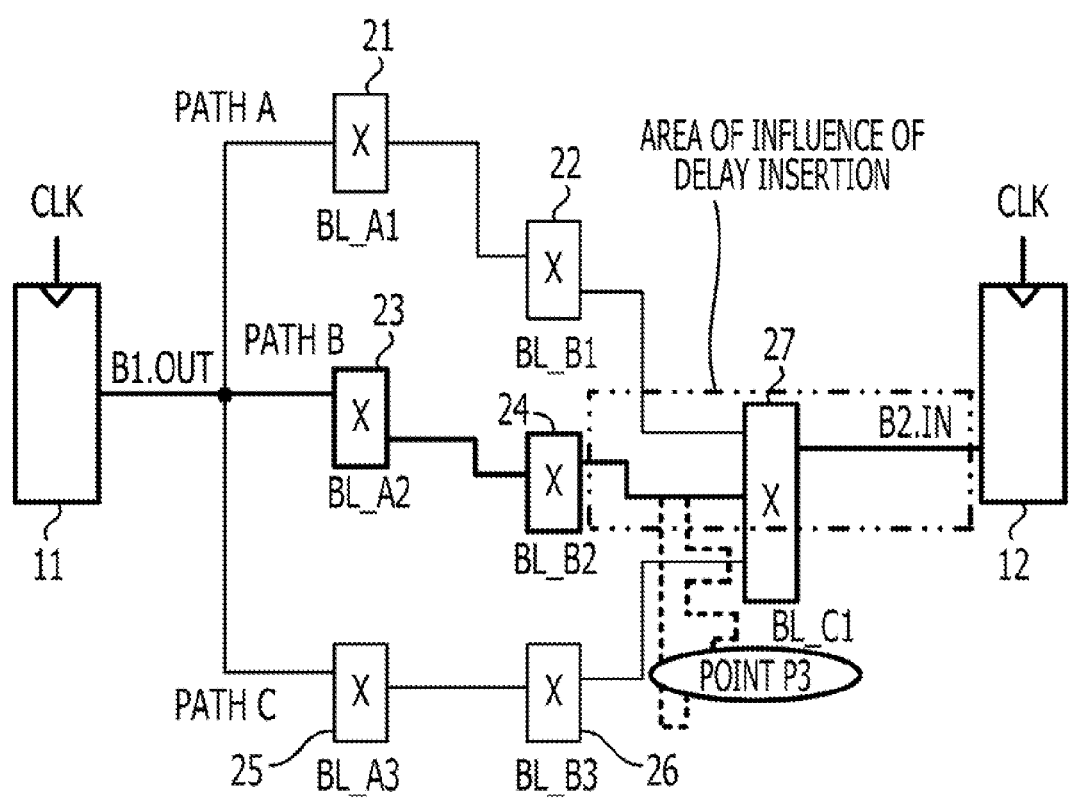
FIG. 10 illustrates an area of influence of a delay of a bypass wiring line inserted to a point P3 in the circuit example.

FIG. 10 illustrates the area of influence caused if a delay of a bypass wiring is inserted to the point P3 in FIG. 7. The wiring line related to the point P3 connects the logic gate 24 and the logic gate 27 forming path B, and thus has no branch to the other paths. The area of influence with the delay inserted to the point P3 becomes an area enclosed by a two-dot-and-three-dash line, and thus affects only path B as illustrated in FIG. 10.

Figure 11:
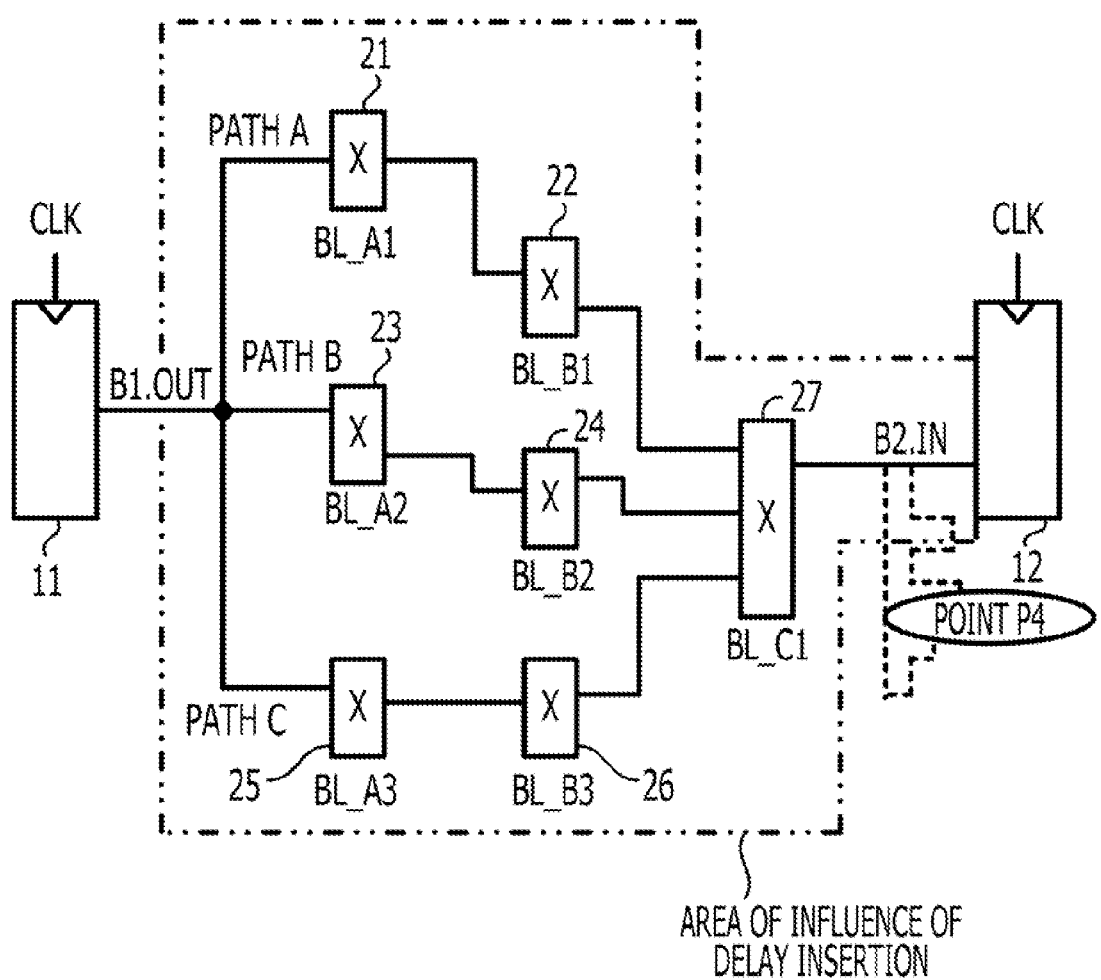
FIG. 11 illustrates an area of influence of a delay of a bypass wiring line inserted to a point P4 in the circuit example.

FIG. 11 illustrates the area of influence caused if a delay of a bypass wiring is inserted to the point P4 in FIG. 7. The wiring line related to the point P4 is shared by path A, path B, and path C, and is connected to the input terminal (B2.IN) of the FF12 serving as an end point of each path. The area of influence with a delay inserted to the point P4 becomes an area enclosed by a two-dot-and-three-dash line, and thus affects all the paths, including path A, path B, and path C as illustrated in FIG. 11.

The area of influence of the delay insertion to each of the four points P1 to P4 illustrated in FIG. 7 becomes different as illustrated in FIGS. 8 to 11. The area of influence of the delay insertion becomes smallest at the two locations, namely, the point P2 and the point P3. Each of the point P2 and the point P3 has neither wiring nor branch, and satisfies the condition 2 (the small number of branches). For this reason, an optimum point is selected from the point P2 and the point P3 in view of the condition 1 (the wiring is not too short), and the condition 3 (the waveform of the signal propagating through the wiring does not have large deformation). If the selected point has a delay margin of the setup time (the condition 4), the selected point becomes a delay insertion point of the bypass wiring operation.

The information of the slew rate analysis result 304(*a*) illustrated in FIG. 3 may be used to determine the distortion of the signal waveform. The information of the slack information file 304(*b*) of FIG. 3 may be used to determine the delay margin of the setup time.

Although a point satisfies the conditions 1 to 3, that point may fail to satisfy the condition 4. More specifically, if a delay is inserted to the point having no slack in the setup time, a setup time error may occur. In such a case, the margin of the setup time is increased together with the correction of the hold-time error such that no setup time error is caused in response to the correction of the hold-time error.

A plurality of paths may suffer from hold-time errors, and a particular net may be involved in a plurality of hold-time errors. In such a case, a delay insertion through the bypass wiring operation is performed on the particular net common to the plurality of hold-time errors. The plurality of hold-time errors may be concurrently corrected. However, if a difference between the error values of the hold-time errors of the plurality of paths sharing the particular net is large, particular attention is desired to be given to the delay value of a delay inserted via the bypass wiring line. If an insertion delay that corrects a hold-time error having a large error value is inserted to the particular net, an excessive delay is imparted to a path having no margin in the setup time, and a setup time error is caused there.

In such a case, the delay insertion through the bypass wiring operation is performed on the particular net by a delay equal to an insertion delay value that causes no setup time error in the path sharing the particular net. If the insertion delay is not sufficient for a path, a delay insertion through an additional bypass wiring operation may be performed on a different point unique to that path. Instead of correcting the particular net common to the plurality of paths, the bypass wiring operation may be performed on a net unique to each of the paths.

Figure 12A:
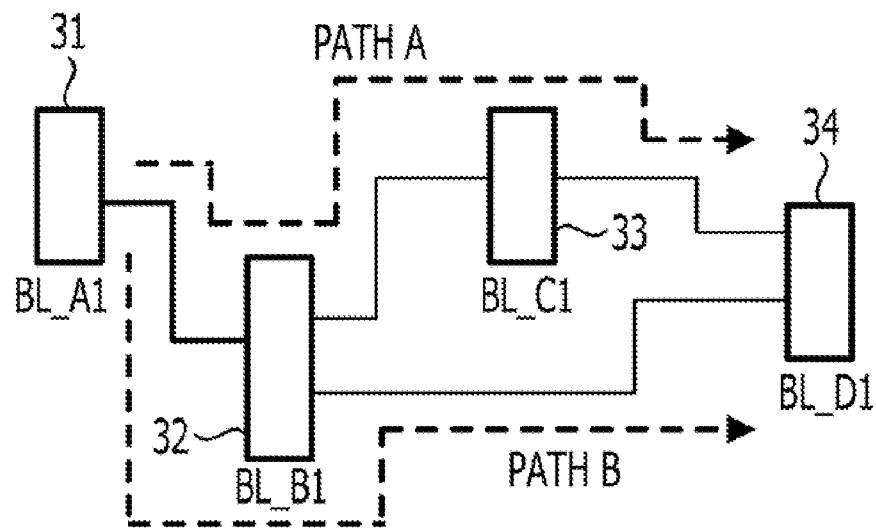
FIGS. 12A and 12B illustrate a net common to a path where a plurality of hold-time errors occur.
Figure 12B:
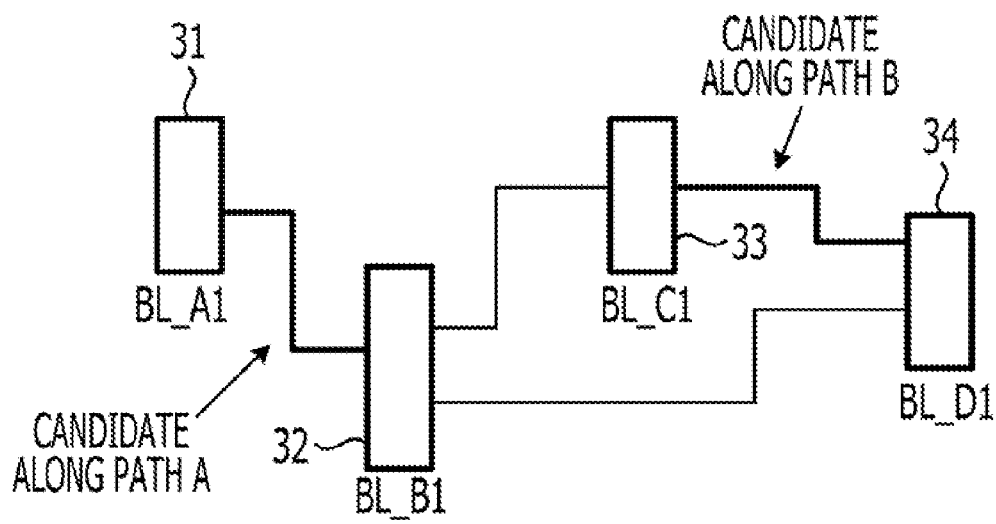

FIGS. 12A and 12B illustrate an example of a net common to a plurality of paths creating hold-time errors. As illustrated in FIG. 12A, path A and path B connect to a timing verification target FF (not illustrated) suffering from a hold-time error and logic gates (BL_A1, BL_B1, BL_C1, and BL_D1) are present along path A and path B. Hold-time errors occur on each of path A and path B. As illustrated in FIG. 12A, path A and path B share a wiring line connecting logic gates BL_A1 and BL_B1.

An extension point candidate to undergo the bypass wiring operation is extracted from each of path A and path B suffering from the hold-time errors. The extension point candidate is extracted on a per path basis. The extension point candidate to undergo the bypass wiring operation is extracted as illustrated in FIG. 12B. More specifically, a wiring line connecting logic gates 33 and 34 may be selected for path A, and a wiring line connecting logic gates 31 and 32 may be selected for path B.

In this case, the extension point selected for path B is common to path A. For this reason, an examination is made to assure that no problem arises if a delay correcting both the hold-time error in path A and the hold-time error in path B is inserted to an extension point selected for path B. More specifically, the examination is made to make sure that the delay insertion to the point common to path A and path B causes no setup time error in either path A or path B.

If no new setup time error is caused by the delay insertion of the delay correcting the hold-time error in each path to the point common to path A and path B, the bypass wiring operation may be performed on only the common point.

A setup time error may be caused in any of the paths if the delay correcting the hold-time error in each path is inserted to the point common to path A and path B. In such a case, the delay correcting a smaller hold-time error is inserted to the common point. A delay is inserted to another point in a path having a larger hold-time error by an amount equal to a delay value deficit lacked by the delay value inserted to the common point.

If a wiring line serving as a point common to a plurality of paths is present, a delay for the hold-time error correction is inserted to the common point. The delay insertion for the hold-time error correction is thus minimized as a whole.

The magnitude of the delay value for the hold-time error correction through the bypass wiring operation may be the level of a delay value that cancels the hold-time error output from the timing verification (S133 of FIG. 3). Alternatively, an insertion delay value through the bypass wiring operation may be a sum of a margin value accounting for an on-chip variation (OCV), as manufacturing variations caused in a semiconductor manufacturing phase, and the value of the hold-time error.

The point (wiring) included in a path having a hold-time error is learned in the delay insertion. In this case, reference is made to the slack information file 304(b) of FIG. 3 of all paths routing through each point. It is then determined whether the delay value to be inserted for the hold-time error correction is smaller than the slack value of the setup time of the related path retained in the slack information file 304(b). If the delay value to be inserted for the hold-time error correction is smaller than the slack value (margin) of the setup time of each of the paths routing through the delay insertion point, the delay insertion point is selected because no new setup time error is caused.

The wiring extension point and the insertion delay value for the hold-time error correction through the bypass wiring operation are thus determined. An extension distance of a wiring increasing the wiring delay by an actual insertion delay value is determined next. A relationship between the extension distance of wiring and the insertion delay by the extended wiring may be determined as an approximate delay value by tentatively determining parameters including a wiring line width, a wiring line length, and a wiring line capacitance. In order not to insert an excessive delay value via a bypass wiring line, a wiring pattern close to an actual wiring line is desired to be assumed and a delay value responsive to the extension distance of wiring is preferably estimated to a modest degree of accuracy.

In a standard delay calculation, all nets forming a path are traced, and delays of all cells and all wirings forming the path are then determined. It is then determined whether the total sum of delay values satisfies a specific timing condition. Since an actual layout pattern is not known before an actual wiring process, an accurate delay value is difficult to determine. A vast amount of time is needed if a timing analysis is performed by extracting a capacitance of an actual wiring through an actual wiring process and calculating delay values.

In the embodiment, the delay information resulting from calculating the timing verification (S133 of FIG. 3) is used and a localized wiring delay of a wiring to be extended through a bypass wiring line is re-calculated with a parameter such as a wiring capacitance virtually set. A delay value close to the results of a calculation of an actual wiring pattern is thus determined. The insertion delay value of the wiring to be extended through the bypass wiring line is calculated in the brief delay calculation (S139) of FIG. 3. The brief delay calculation (S139) is described below with reference to FIG. 13.

Figure 13:
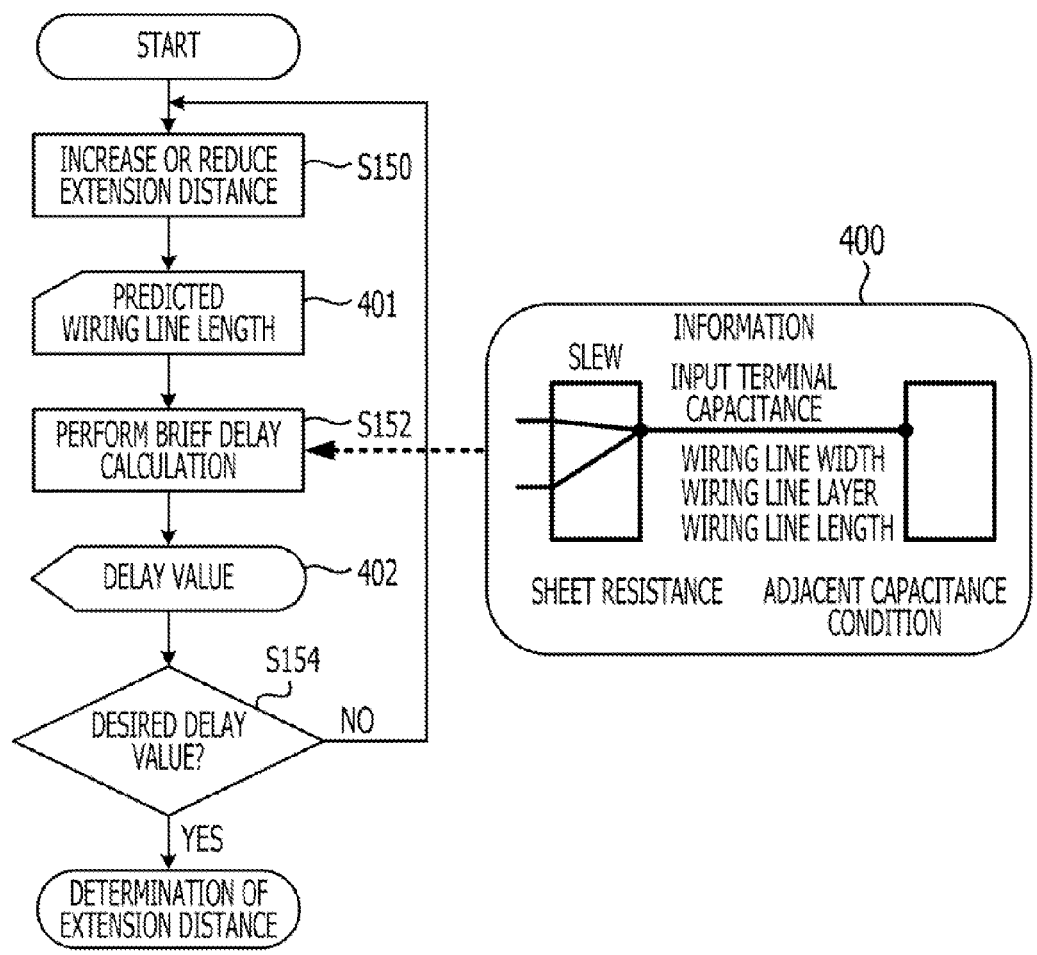
FIG. 13 illustrates a process that determines a extension distance needed for a bypass wiring line through the calculation of a localized delay.

FIG. 13 illustrates an operation to determine an extension distance needed for a bypass wiring through a localized delay calculation. In the flow of FIG. 13, an extension distance for a tentative bypass wiring is set in S150. Set in S150 is an extension distance predetermined in response to the magnitude of the value of the hold-time error of a path including a net as a bypass wiring target. In such a case, a particular small value of the extension distance may be set regardless of the magnitude of the value of the hold-time error. In S150, a predicted wiring line length 401 is output. The predicted wiring line length 401 is the sum of the set extension distance and an original wiring line length of the actual wiring pattern serving as the bypass wiring target.

If the predicted wiring line length 401 is determined, a delay value 402 is calculated in accordance with the capacitance definition file 304(c) and the path delay analysis result 304(d) of FIG. 3 (not illustrated in FIG. 13), and a variety of parameters used in the delay calculation of FIG. 13 (S152). In the calculation of the delay value 402 of the wiring as the extension target, the delay values of wirings and cells other than the bypass wiring target are calculated in accordance with the information of the actually wired line (the capacitance definition file 304(c) and the path delay analysis result 304(d)) (S152). In the calculation of the delay of the wiring as the bypass wiring target, an actual wiring line layer, a wiring line width, a connection condition of a wiring location are taken into account, and a virtual wiring capacitance is set up based on information 400 related to the variety of parameters (S152). The information 400 related to the variety of parameters used in the delay calculation in S152 is described in detail with reference to FIGS. 14A to 14D.

Figure 14A:
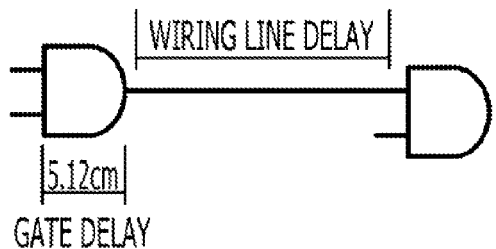
FIGS. 14A to 14D illustrate information used in the delay calculation.
Figure 14B:
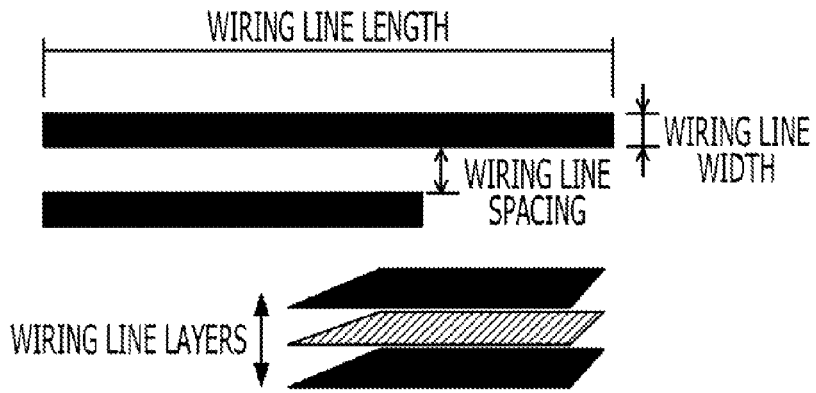
Figure 14C:
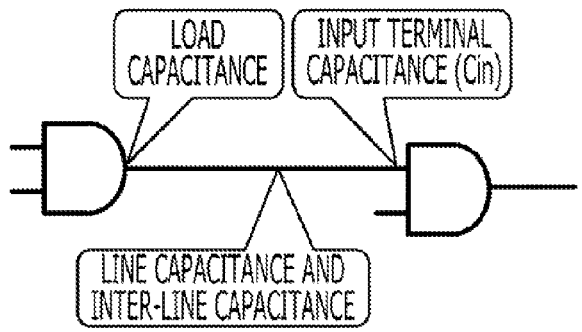
Figure 14D:
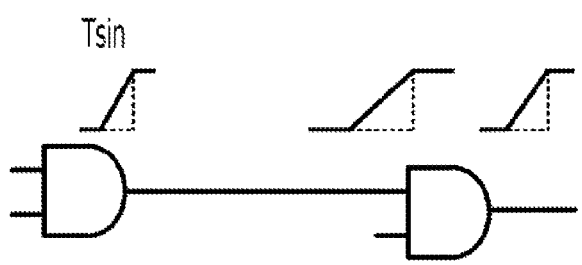

FIGS. 14A to 14D illustrate information for use in the delay calculation. In the delay calculation, a gate delay and a wiring delay are calculated as a delay of a logic cell (FIG. 14A). The wiring delay calculation is performed in accordance with parameters including a wiring line length, a wiring line width, and a sheet resistance of a wiring (FIG. 14B), and parameters including a wiring line capacitance, and an input terminal capacitance (Cin) of a cell as a communication destination of the wiring (FIG. 14C). The gate delay is calculated in accordance with an output terminal capacitance (CL) of the cell, and a distortion of a signal input to the input terminal of the cell (Tsin) in addition to the delay of the cell.

The delay value may be calculated under a particular condition of temperature, voltage, and a process condition. Alternatively, the delay calculation may be performed in accordance with the best condition and the worst condition, and a determination is made as to whether a desired delay value results under each of the conditions.

Returning to the flow of FIG. 13, the predicted delay value 402 of the bypass wiring line is calculated in S152. It is verified whether a difference between the determined delay value 402 and the original delay value prior to the bypass wiring operation is a desired delay increase. In other words, the difference is a delay value that corrects the hold-time error (S154). If it is determined in S154 that the difference is the desired delay value (yes from S154), the delay distance responsive to the delay value becomes the delay distance of the bypass wiring target point.

If no desired delay value is obtained in S154 (no from S154), i.e., if the delay value is too small or too large, processing returns to S150 to increase or reduce the extension distance. The predicted wiring line length 401 is then output again, followed by S152 to S154. If a desired extension distance is determined, the wiring parameter determination operation (S140) of FIG. 3 is performed. The determined parameter is accounted for in the net extension instruction card 300. If the parameter for the bypass wiring operation to be performed on the bypass wiring target extracted in S137 of FIG. 3 is accounted for in the net extension instruction card 300, processing proceeds to S130 of FIG. 3. The actual bypass wiring operation is thus performed.

The bypass wiring operation (S130 of FIG. 3) corrects the hold-time error in accordance with the information stored on the net extension instruction card 300 and the layout DB 301 having the existing layout data stored thereon. In other words, the wiring extension operation is performed on all the nets specified by the net extension instruction card 300 by a length responsive to the required extension distance. Unless otherwise particularly noted, the wiring extension operation does not modify a wiring unrelated to the cell placement and the hold-time error (S130 of FIG. 3). This is because the delay insertion through the bypass wiring to part of the wiring of the path having the hold-time error is performed to correct the hold-time error without generating a new timing error. The method of the bypass wiring operation is described with reference to FIGS. 15 and 16.

FIG. 15 illustrates the method of the bypass wiring operation that is performed using a virtual wiring prohibitive area. In the method of the bypass wiring operation of FIG. 15, a frame 40 is tentatively set up for a wiring line 50, which is to undergo the bypass wiring operation. The frame 40 is a region having a constant area and permitting a bypass wiring line to be drawn therewithin. Hatched regions 60 and 61 are actual wiring prohibitive areas present within the frame 40. A start point and an end point of the wiring line 50 as a bypass wiring target within the frame 40 are respectively labeled "S" and "T."

The wiring between "S" and "T" of the wiring line 50 as the bypass wiring target is extended in the method of the bypass wiring of FIG. 15 such that the virtual wiring prohibitive area 62 accounting for the extension distance is arranged to straddle the wiring line 50. Referring to FIG. 15, the virtual wiring prohibitive area 62 extends upward to the top side of the frame 40. If a layout is designed accounting for the virtual wiring prohibitive area 62, the wiring line 50 is extended downward as a bypass wiring. The virtual wiring prohibitive area 62 is set such that the sum of the lengths of the left and right sides of the virtual wiring prohibitive area 62 below the wiring line 50 and the length of the bottom side of the virtual wiring prohibitive area 62 becomes the extension distance stored on the net extension instruction card 300. The wiring line 50 is thus re-routed such that the virtual wiring prohibitive area 62 is avoided. The bypass wiring operation is thus performed.

The wiring prohibitive areas 60 and 61 are also present in addition to the virtual wiring prohibitive area 62 in FIG. 15. The wiring line 50 is thus drawn along a bypass wiring as denoted by a broken line 51 such that the wiring prohibitive areas 60 to 62 are not crossed. If the wiring line length of the bypass wiring line denoted by the broken line 51 equals an extension length extended by the desired extension distance, the bypass wiring operation to the wiring line 50 is complete.

The effect of the wiring prohibitive areas 60 and 61 other than the virtual wiring prohibitive area 62 may become a wiring line 51 longer than the desired extension distance of the wiring line 50. In such a case, the virtual wiring prohibitive area 62 may be shifted in position, or changed in size such that the bypass wiring line 51 having the desired extension distance is drawn.

The virtual wiring prohibitive area 62 may partially overlap the wiring prohibitive area 60. The size of the virtual wiring prohibitive area 62 may be determined in view of the length of the outline of the non-overlapping area of the wiring prohibitive area 60. In this way, a more accurate bypass wiring operation in view of the existing wiring prohibitive area is performed.

If no appropriate bypass wiring line results within the tentatively set frame 40, the frame 40 may be shifted in position or expanded in area. A virtual wiring prohibitive area 62 is set again, and a trial is made such that a desired extension distance is achieved by a bypass wiring line. Alternatively, the results of the bypass wiring operation are stored, and the frame 40 is expanded in area. In view of a deficient portion of the extension distance, another virtual prohibitive area is added to further extend the wiring as a bypass wiring line.

If the frame 40 is sufficiently wide, the virtual wiring prohibitive area 62 is set up such that areas for bypass wiring lines are arranged on upper and lower sides of the wiring line 50 of FIG. 15. One of the bypass wiring lines giving an extension distance closer to the desired extension distance may thus be used.

Figure 16:
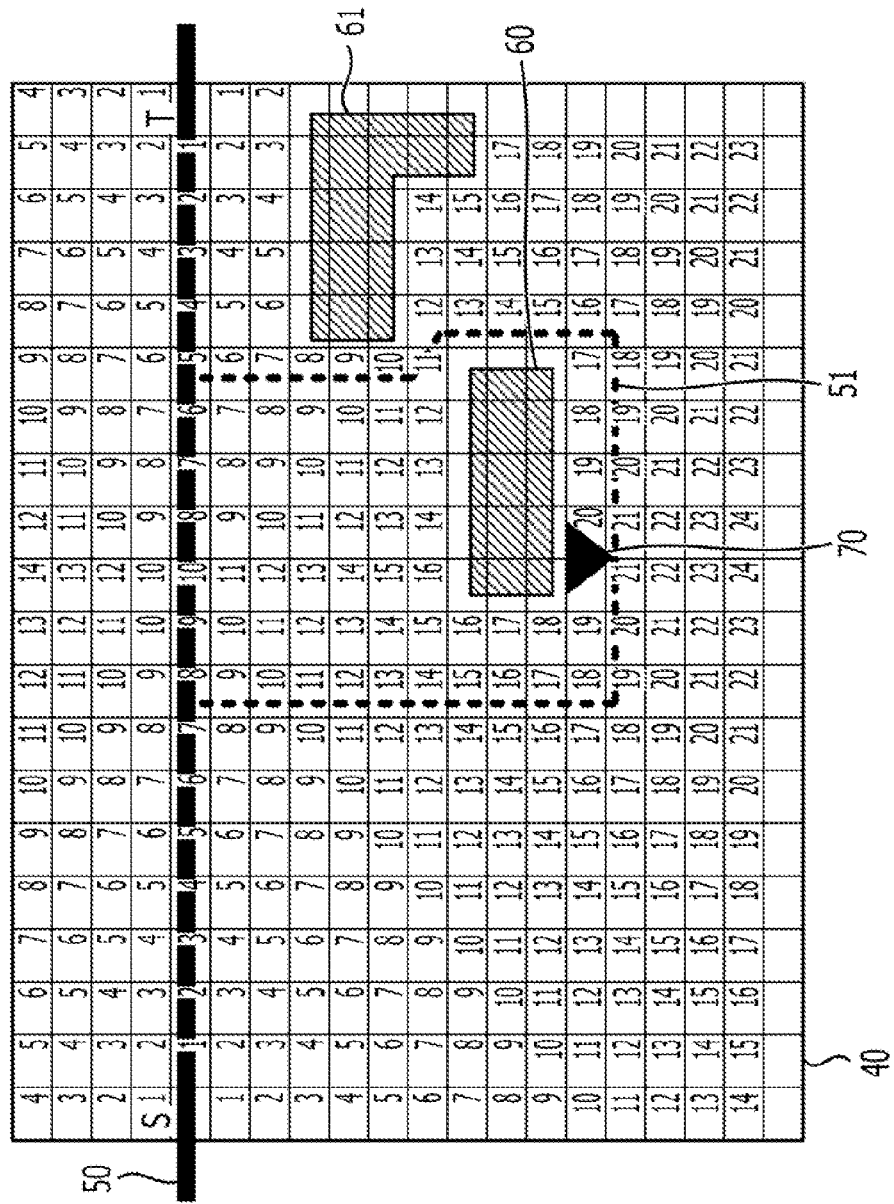
FIG. 16 illustrates a method of making a bypass wiring line that is routed via a bypass point.

FIG. 16 illustrates the method of the bypass wiring operation in which a bypass wiring line is extended via a bypass point. In the method of FIG. 16, the area of the frame 40 is partitioned into rectangles of a specific size. Each rectangle may be determined with respect to a minimum grid width used in the layout design process, or may have any specific size. Label information is set at each of the rectangles within the frame 40. The label information indicates how many rectangles each of the rectangles is spaced apart by from the start point S and the end point T of the wiring line 50 in vertical and horizontal directions. The label information set at each rectangle is a distance from the start point S and the end point T of the wiring line 50 within the frame 40 represented by Manhattan length according to a specific length unit.

A bypass wiring line passing point is determined in accordance with the set label information in this way. The bypass wiring line passing point satisfies the condition of the extension distance of the wiring as the bypass wiring target stored on the net extension instruction card 300. The wiring of the wiring line 50 is corrected such that the wiring line 50 passes through the determined bypass wiring line passing point. How the wiring of the wiring line 50 is corrected is described with reference to FIG. 16.

Referring to FIG. 16, the length between the start point S and the end point T of the wiring line 50 within the frame 40 may be 18 (unit of length is optional). The sum of the original length of the wiring line 50 and the length of the extension distance specified by the net extension instruction card 300 may be 42.

The determination method of the bypass wiring line passing point to the wiring line 50 is discussed. Searched is a position spaced by a distance of 21, half the length of 42 equal to the wiring line length desired for the wiring line 50, from each of the start point S and the end point T of the wiring line 50. If a point of the position spaced by a distance of 21 from each of the start point S and the end point T of the wiring line 50 is found, that point is the bypass wiring line passing point. As illustrated in FIG. 16, the bypass wiring line passing point for the wiring line 50 is denoted by a triangle symbol 70.

As illustrated in FIG. 16, the bypass wiring line passing point 70 is equidistant from the start point S and the end point T of the wiring line 50. It is sufficient if the length of the bypass wiring line is 42. Any point having the sum of the distances from the start point S and the end point T being 42 serves as a bypass wiring line passing point.

If the wiring prohibitive areas 60 and 61 are within the frame 40 as illustrated in FIG. 16, it is arranged that the label information related to the wiring distance from the start point S and the end point T is not set within the wiring prohibitive areas 60 and 61. With this arrangement, the bypass wiring line passing point is prevented from being erroneously set within the wiring prohibitive areas 60 and 61.

The bypass wiring line passing point (such as the triangle symbol 70 of FIG. 16) is set. The wiring is performed by reverse-tracing from the bypass wiring line passing point to each of the start point S and the end point T of the wiring line 50. The wiring line 50 having undergone the bypass wiring operation and passing through the bypass wiring line 51 thus results. If no appropriate bypass wiring line is obtained within the tentatively set frame 40, the frame 40 may be shifted in position or expanded in area. A bypass wiring line passing point 70 is set up again. A trial is made to determine whether a bypass wiring line having a desired extension distance is obtained or not.

In the bypass wiring method of FIG. 16, the bypass wiring line passing point is determined in accordance with the information of the distances from the start point S and the end point T of the wiring line 50. The wiring line 50 within the frame 40 is a target of the bypass wiring operation. The wiring line 50 is thus modified such that the wiring line 50 passes through the determined bypass wiring line passing point. In this way, the bypass wiring operation target is extended in length to achieve a desired wiring distance. The increase in the delay responsive to the extension distance thus corrects the hold-time error occurring in the path including the wiring.

The two methods of the bypass wiring operation have been discussed with reference to FIGS. 15 and 16. The bypass wiring operation of the embodiments of the invention is not limited to these methods. A different method of the bypass wiring operation may also be used.

Figure 17:
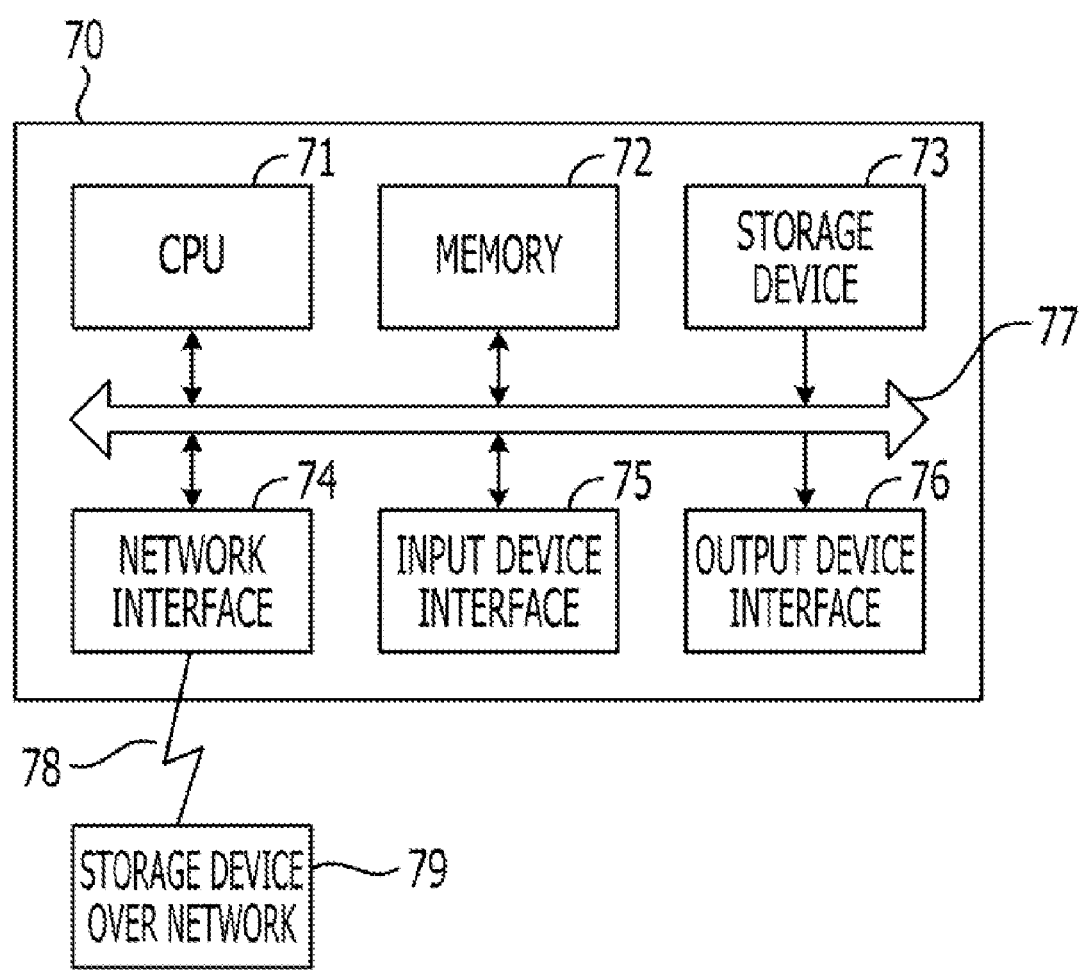
FIG. 17 illustrates a configuration of computer hardware to perform the layout design process of the embodiment.

FIG. 17 illustrates a hardware configuration of a computer 70 that performs the layout design process of the embodiments. The computer 70 includes a central processing unit (CPU) 71, memory 72, storage device 73, network interface circuit 74, interface circuit 75 interfaced to input devices including a keyboard and a mouse, and interface circuit 76 interfaced to output devices including a display. A storage device 79 over a network outside the computer 70 is connected to the computer 70 via a specific network communication line 78.

Each of the storage device 73 and the storage device 79 over the network includes a magnetic disc, an optical disc, a magneto-optical disc, or a semiconductor memory device, and also includes a drive that handles computer readable recording media. The computer readable recording media are any computer readable recording media and include a magnetic tape, a memory card, optical discs (compact disc ROM (CD-ROM), digital versatile disc ROM (DVD-ROM), and the like), magneto-optical discs (magneto-optical disc (MO), MiniDisc (MD), and the like).

Each of the storage device 73 and the storage device 79 over the network stores circuit information 70 serving as a layout target, library 71 used in the layout process, and a program 72 performing the layout process. The CPU 71 accesses the memory 72, the storage devices 73 and 79, and a variety of input-output devices via a bus 77 and the interface circuits (74 to 76). The CPU 71 thus executes a variety of layout designing programs stored on one of the storage device 73 and the storage device 79, or the variety of layout designing programs loaded on the memory 72. The variety of layout designing programs discussed with reference to the embodiments are executed by the CPU 71 in the computer 70 of FIG. 17.

The layout designing program of the embodiments automatically extracts a wiring having a hold-time error that is improved through the bypass wiring operation in accordance with the result information 304 from the timing verification (S133 of FIG. 3) in S135 and S137, and calculates a distance along which the extracted wiring is extended (S139). The layout designing program determines a parameter to perform a bypass wiring on a per calculated wiring basis (S140), and outputs the determined parameter to the net extension instruction card 300. In the automated wiring operation (S130) performed through the layout designing program, the bypass wiring operation is performed in accordance with the net extension instruction card 300, and the delay insertion is performed to correct the hold-time error. The layout designing program performs the timing verification (S133) again after the bypass wiring operation and then repeats these operations (S130 to S133 and S135 to S140) until no timing error is present.

According to the embodiments, the hold-time error having a small error remaining in the timing verification at the final phase of the layout design is corrected by inserting a minimum delay without affecting another circuit free from timing error.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A designing apparatus for designing a semiconductor integrated circuit, the designing apparatus comprising:
    a memory configured to store design data; and
    a processor configured to execute a procedure of
        verifying a timing of the circuit based on delay information included in the design data stored in the memory, the delay information is extracted from results of placing and wiring of the semiconductor integrated circuit,
        determining whether each value of hold-time errors generated as a result of the timing verification is smaller than a criteria value,
        extracting, when the value of a hold-time error is smaller than the criteria value, a wiring line in which the hold-time error is improved by performing a wiring line extension process, the wiring line is included in a path having the hold-time error,
        calculating, for the extracted wiring line, a wiring line extension distance corresponding to an insertion delay value that improves the hold-time error of the path including the extracted wiring line,
        performing the wiring line extension process to extend the extracted wiring line by the calculated wiring line extension distance, and
        setting a virtual wiring prohibitive area that causes the extracted wiring line to route via a bypass wiring line corresponding to the calculated wiring line extension distance, and extends the extracted wiring line.

2. The designing apparatus according to claim 1, wherein a minimum delay value out of delay values of delay buffers used for fixing the hold-time error serves as the criteria value to be compared with the value of the hold-time error.

3. The designing apparatus according to claim 1, wherein the processor extracts, as a wiring line that is to undergo the wiring line extension process, a wiring line having a small number of branches and having a waveform distortion of a signal propagating therethrough falling within a reference slew rate value, from among the wiring lines included in the path that has caused the hold-time error.

4. The designing apparatus according to claim 3, wherein the processor extracts the wiring line as a target of the wiring line extension process when each of the hold-time errors generated is smaller than the criteria value.

5. The designing apparatus according to claim 1, wherein the processor calculates a wiring extension delay of the extracted wiring line according to the calculated wiring line extension distance by tentatively setting a wiring line length, a wiring line width, and a wiring line capacitance to the extracted wiring line,
    predicts a path delay value with the wiring line extended, using the delay value of the wiring extension delay calculated on the extracted wiring line, and a delay value caused by an actual layout process result of a cell included in the path having the wiring line, and wiring lines other than the extracted wiring line included in the path, and
    determines whether the predicted path delay value is sufficient to fix the hold-time error, and when the predicted path delay value is not sufficient to fix the hold-time error, calculates again the wiring extension delay with the wiring line extension distance modified.

6. The designing apparatus according to claim 1, wherein in the extension of the extracted wiring line, the processor sets a frame of a region where a process to extend the extracted wiring line is performed,
    segments the set frame into a plurality of area segments, each area segment having a side of a specific length,
    sets in each area segment a first label value, the first label value representing how many area segments the area segment is spaced apart by in horizontal and vertical directions from a start point of the extracted wiring line within the frame,
    sets in each area segment a second label value, the second label value representing how many area segments the area segment is spaced apart by in horizontal and vertical directions from an end point of the extracted wiring line within the frame,
    sets a bypass wiring line passing point through which the wiring line, when extended, passes, the bypass wiring line passing point being set in an area segment where the sum of the first label value and the second label value equals the sum of the wiring line length of the extracted wiring line within the frame and the calculated wiring line extension distance, and
    modifies the extracted wiring line such that the extracted wiring line passes through the bypass wiring line passing point.

7. A designing method of designing a semiconductor integrated circuit using a computer, the method comprising:
    verifying a timing of the circuit, using a computer, based on delay information included in the design data stored in the memory, the delay information is extracted from results of placing and wiring of the semiconductor integrated circuit;
    determining whether each value of hold-time errors generated as a result of the timing verification is smaller than a criteria value;
    extracting, when the value of a hold-time error is smaller than the criteria value, a wiring line in which the hold-time error is improved by performing a wiring line extension process, the wiring line is included in a path having caused the hold-time error;
    calculating, for the extracted wiring line, a wiring line extension distance corresponding to an insertion delay value that improves the hold-time error of the path including the extracted wiring line;
    performing the wiring line extension process to extend the extracted wiring line by the calculated wiring line extension distance, and
    setting a virtual wiring prohibitive area that causes the extracted wiring line to route via a bypass wiring line corresponding to the calculated wiring line extension distance, and extends the extracted wiring line.

8. The designing method according to claim 7, wherein a minimum delay value out of delay values of delay buffers used for fixing the hold-time error serves as the criteria value to be compared with the value of the hold-time error.

9. The designing method according to claim 7, further comprises extracting, as a wiring line that is to undergo the wiring line extension process, a wiring line having a small number of branches and having a waveform distortion of a signal propagating therethrough falling within a reference slew rate value, from among the wiring lines included in the path that has caused the hold-time error.

10. The designing method according to claim 9, further comprising extracting the wiring line as a target of the wiring line extension process when each of the hold-time errors generated is smaller than the criteria value.

11. The designing method according to claim 7, further comprising calculating a wiring extension delay of the extracted wiring line according to the calculated wiring line extension distance by tentatively setting a wiring line length, a wiring line width, and a wiring line capacitance to the extracted wiring line,
predicting a path delay value with the wiring line extended, using the delay value of the wiring extension delay calculated on the extracted wiring line, and a delay value caused by an actual layout process result of a cell included in the path having the wiring line, and wiring lines other than the extracted wiring line included in the path, and
determining whether the predicted path delay value is sufficient to fix the hold-time error, and when the predicted path delay value is not sufficient to fix the hold-time error, calculates again the wiring extension delay with the wiring line extension distance modified.

12. The designing method according to claim 7, further comprising setting a frame of a region where a process to extend the extracted wiring line is performed,
segmenting the set frame into a plurality of area segments, each area segment having a side of a specific length,
setting in each area segment a first label value, the first label value representing how many area segments the area segment is spaced apart by in horizontal and vertical directions from a start point of the extracted wiring line within the frame,
setting in each area segment a second label value, the second label value representing how many area segments the area segment is spaced apart by in horizontal and vertical directions from an end point of the extracted wiring line within the frame,
setting a bypass wiring line passing point through which the wiring line, when extended, passes, the bypass wiring line passing point being set in an area segment where the sum of the first label value and the second label value equals the sum of the wiring line length of the extracted wiring line within the frame and the calculated wiring line extension distance, and
modifying the extracted wiring line such that the extracted wiring line passes through the bypass wiring line passing point.

13. A computer-readable, non-transitory medium storing therein an integrated-circuit designing program for designing a semiconductor integrated circuit, the program causing a computer, which has a memory configured to store design data, to execute a procedure, the procedure comprising:
verifying a timing of the circuit based on delay information included in the design data stored in the memory, the delay information is extracted from results of placing and wiring of the semiconductor integrated circuit;
determining whether each value of hold-time errors generated as a result of the timing verification is smaller than a criteria value;
extracting, when the value of a hold-time error is smaller than the criteria value, a wiring line in which the hold-time error is improved by performing a wiring line extension process, the wiring line is included in a path having caused the hold-time error;
calculating, for the extracted wiring line, a wiring line extension distance corresponding to an insertion delay value that improves the hold-time error of the path including the extracted wiring line;
performing the wiring line extension process to extend the extracted wiring line by the calculated wiring line extension distance, and
setting a virtual wiring prohibitive area that causes the extracted wiring line to route via a bypass wiring line corresponding to the calculated wiring line extension distance, and extends the extracted wiring line.

14. The computer-readable, non-transitory medium according to claim 13, wherein a minimum delay value out of delay values of delay buffers used for fixing the hold-time error serves as the criteria value to be compared with the value of the hold-time error.

15. The computer-readable, non-transitory medium according to claim 13, wherein the procedure further comprises extracting, as a wiring line that is to undergo the wiring line extension process, a wiring line having a small number of branches and having a waveform distortion of a signal propagating therethrough falling within a reference slew rate value, from among the wiring lines included in the path that has caused the hold-time error.

16. The computer-readable, non-transitory medium according to claim 15, wherein the procedure further comprises extracting the wiring line as a target of the wiring line extension process when each of the hold-time errors generated is smaller than the criteria value.

17. The computer-readable, non-transitory medium according to claim 13, wherein the procedure further comprises calculating a wiring extension delay of the extracted wiring line according to the calculated wiring line extension distance by tentatively setting a wiring line length, a wiring line width, and a wiring line capacitance to the extracted wiring line,
predicting a path delay value with the wiring line extended, using the delay value of the wiring extension delay calculated on the extracted wiring line, and a delay value caused by an actual layout process result of a cell included in the path having the wiring line, and wiring lines other than the extracted wiring line included in the path, and
determining whether the predicted path delay value is sufficient to fix the hold-time error, and when the predicted path delay value is not sufficient to fix the hold-time error, calculates again the wiring extension delay with the wiring line extension distance modified.

18. The computer-readable, non-transitory medium according to claim 13, wherein the performing sets a frame of a region where a process to extend the extracted wiring line is performed,
segments the set frame into a plurality of area segments, each area segment having a side of a specific length,
sets in each area segment a first label value, the first label value representing how many area segments the area segment is spaced apart by in horizontal and vertical directions from a start point of the extracted wiring line within the frame, sets in each area segment a second label value, the second label value representing how many area segments the area segment is spaced apart by in horizontal and vertical directions from an end point of the extracted wiring line within the frame, sets a bypass wiring line passing point through which the wiring line, when extended, passes, the bypass wiring line passing point being set in an area segment where the sum of the first label value and the second label value equals the sum of the wiring line length of the extracted wiring line within the frame and the calculated wiring line extension distance, and modifies the extracted wiring line such that the extracted wiring line passes through the bypass wiring line passing point.

* * * * *